US012104958B2

(12) United States Patent
Kar et al.

(10) Patent No.: US 12,104,958 B2
(45) Date of Patent: Oct. 1, 2024

(54) DEVICE AND METHOD FOR COLOR INDENTIFICATION

(71) Applicant: Northeastern University, Boston, MA (US)

(72) Inventors: Swastik Kar, Belmont, MA (US); Davoud Hejazi, Malden, MA (US); Sarah Ostadabbas, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/777,091

(22) PCT Filed: Nov. 16, 2020

(86) PCT No.: PCT/US2020/060791
§ 371 (c)(1),
(2) Date: May 16, 2022

(87) PCT Pub. No.: WO2021/167661
PCT Pub. Date: Aug. 26, 2021

(65) Prior Publication Data
US 2022/0412804 A1    Dec. 29, 2022

Related U.S. Application Data

(60) Provisional application No. 62/988,902, filed on Mar. 12, 2020, provisional application No. 62/946,617, (Continued)

(51) Int. Cl.
*G01J 3/46* (2006.01)
*G01J 3/12* (2006.01)
*G01J 3/51* (2006.01)

(52) U.S. Cl.
CPC .............. *G01J 3/462* (2013.01); *G01J 3/513* (2013.01); *G01J 2003/1213* (2013.01)

(58) Field of Classification Search
CPC ..... G01J 3/462; G01J 3/513; G01J 2003/1213
See application file for complete search history.

(56) References Cited

U.S. PATENT DOCUMENTS 5,072,109 A * 12/1991 Aguilera, Jr. ............. G01J 3/51
359/359
7,388,665 B2 * 6/2008 Ashdown ................. G01J 3/51
250/226
(Continued)

FOREIGN PATENT DOCUMENTS

WO     2010070111 A1   6/2010

OTHER PUBLICATIONS

Hejazi et al., "Transition Metal Dichalcogenide Thin Films for Precise Optical Wavelength Estimation Using Bayesian Inference", ACS Applied Nano Materials, 2.7 (2019) pp. A-J (10 pages).
(Continued)

*Primary Examiner* — Dominic J Bologna
*Assistant Examiner* — Kemaya Nguyen
(74) *Attorney, Agent, or Firm* — Verrill Dana LLP

(57) ABSTRACT

Devices and methods of the present technology utilize wavelength-dependent transmittance of 2D materials to identify the wavelength of an electromagnetic radiation. A wide range of 2D materials can be used, making possible the use of the technology over a large portion of the electromagnetic spectrum, from gamma rays to the far infrared. When combined with appropriate algorithms and artificial intelligence, the technology can identify the wavelength of one or more monochromatic sources, or can identify color through the use of a training set. When applied in an array format, the technology can provide color imaging or spectral imaging using different regions of the electromagnetic spectrum.

25 Claims, 24 Drawing Sheets

Related U.S. Application Data filed on Dec. 11, 2019, provisional application No. 62/936,368, filed on Nov. 15, 2019.

(56) References Cited

U.S. PATENT DOCUMENTS

| | | |
|---|---|---|
| 9,952,096 B2 * | 4/2018 | Kats .......................... G01J 3/26 |
| 2012/0129269 A1 | 5/2012 | Choi et al. |
| 2018/0203263 A1 | 7/2018 | Long et al. |
| 2018/0294376 A1 | 10/2018 | Tian et al. |

OTHER PUBLICATIONS

Hejazi et al., "Transition Metal Dichalcogenide Thin Films for Precise Optical Wavelength Estimation Using Bayesian Inference", (Supporting Information), Applied Nano Materials, (2019) pp. S1-S7 (7 pages).

Hejazi et al., "Development of use-specific high-performance cyber-nanomaterial optical detectors by effective choice of machine learning algorithms", Machine Learning: Science and Technology, 1, (2020) 025007, 16 pages.

* cited by examiner

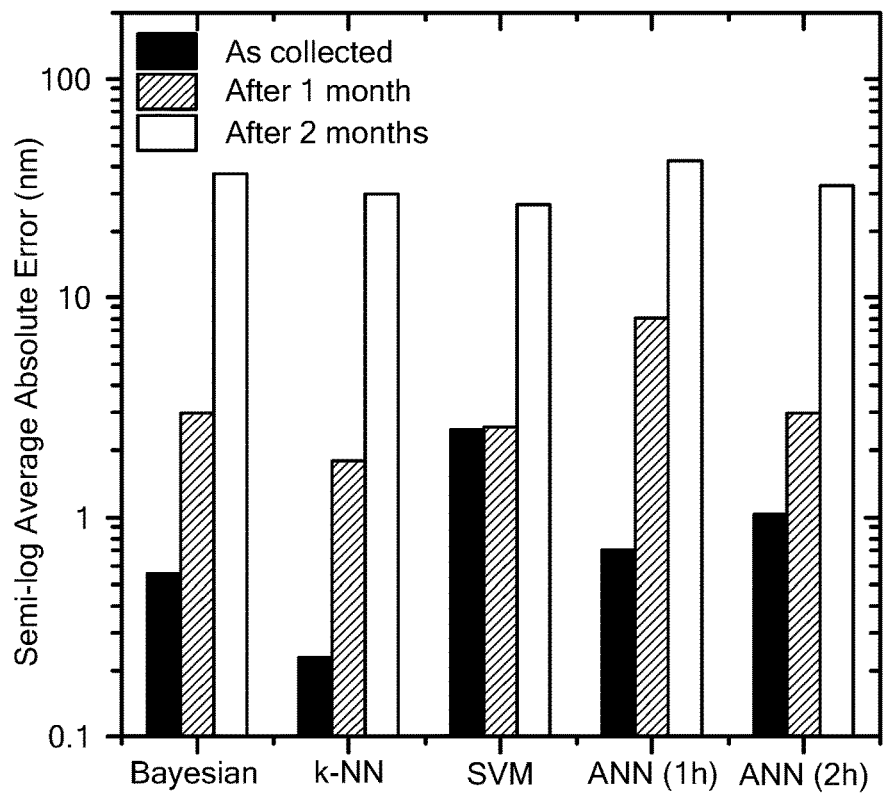
FIG. 14A
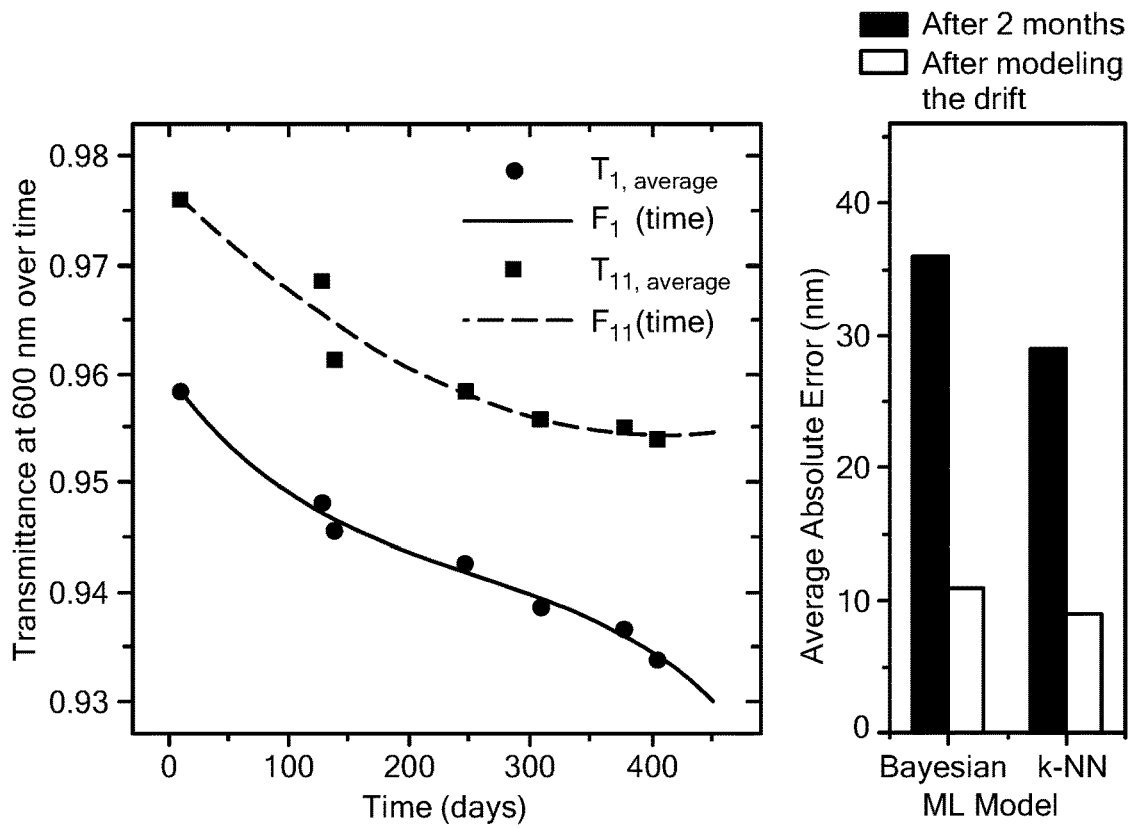
FIG. 14B
FIG. 14C

DEVICE AND METHOD FOR COLOR INDENTIFICATION

CROSS-REFERENCE TO RELATED APPLICATIONS

This application claims priority to U.S. Provisional Application No. 62/936,368, filed 15 Nov. 2019; this application claims priority to U.S. Provisional Application No. 62/946,617, filed 11 Dec. 2019, and this application claims priority to U.S. Provisional Application No. 62/988,902, filed 12 Mar. 2020, all of which are hereby incorporated by reference in entirety.

STATEMENT REGARDING FEDERALLY SPONSORED RESEARCH OR DEVELOPMENT

This invention was developed with financial support from Grant No. 1351424 from the National Science Foundation. The U.S. Government has certain rights in the invention.

BACKGROUND

The ability to perform wavelength-selective photodetection has remained one of the most exciting areas of research in optoelectronics because of its potential. In the simplest form, a photodetector is a light-sensitive semiconductor that operates in a conductive, diode, or transistor mode and responds by generating a change in a voltage or current to an incident light. Most conventional semiconductor photodetectors are broadband; i.e., they respond to a broad range of wavelengths and hence are not intrinsically wavelength selective. Over a large bandwith (e.g., the visible spectrum), conventional photodetectors are not capable of responding selectively to incident light with a specific wavelength. However, a detection system may need to identify the wavelength of any incident light whose intensity is unknown. A detector system capable of accurately discerning the wavelength of any incident light without the use of a diffraction grating or prism could have immense relevance for applications such as bionic vision, robotic vision, and light detection for industrial, scientific, and military applications. Typically, a wavelength estimating system (e.g., in spectrometers) uses either a large number of photodetectors or an intricate diffraction-grating-based monochromator coupled to one or two photodetectors to perform the task.

Existing technologies enabling machines to sense color include image recognition and optical spectroscopy. Image recognition categorizes a digital image by comparing its pixels to a huge number of reference images. Spectroscopy, on the other hand, can give the intensity as a function of wavelength for an unknown light source, but its output is a spectrum rather than an identification of color. Improved methods and devices are needed to allow machines to detect and compare colors of objects in their environment quickly, inexpensively, and with simple equipment.

SUMMARY

The present technology provides devices and methods which, coupled with machine learning algorithms, utilize the wavelength dependence of the transmittance of 2D materials accurately identify the wavelength of an incoming electromagnetic radiation. Neither the wavelength nor the intensity or power of the incoming radiation needs to be known beforehand. The wavelength band of incoming electromagnetic radiation suitable for use with a given device can be selected based on the broadband transmittance of the materials used. A wide range of materials can be used, making possible the use of the technology over a large portion of the electromagnetic spectrum, from gamma rays to the far infrared. When combined with appropriate algorithms and artificial intelligence, the technology can be applied to identify the wavelength of one or more monochromatic sources, or to identify color by the use of a training set. When applied in an array format, the technology can provide color imaging or spectral imaging using different regions of the electromagnetic spectrum.

The present technology can be further summarized by the following list of features.

1. A device for identifying a wavelength of an electromagnetic radiation within a wavelength band, the device comprising:
   (i) a first two-dimensional material having a nanoscale thickness and a first wavelength-dependent transmittance over the wavelength band;
   (ii) a second two-dimensional material having a nanoscale thickness and a second wavelength-dependent transmittance over the wavelength band;
   (iii) one or more detectors suitable for detecting electromagnetic radiation over the wavelength band; wherein the device is configured to allow the electromagnetic radiation to penetrate the first two-dimensional material and illuminate one of said one or more detectors, whereby the detector provides a first electrical signal, and to allow the electromagnetic radiation to penetrate the second two-dimensional material and illuminate one of said one or more detectors, whereby the detector provides a second electrical signal; and optionally
   (iv) a processor and a memory comprising instructions for identifying the wavelength of said electromagnetic radiation using said first and second electrical signals.
2. The device of feature 1, wherein the wavelength band is in the range from about 1 picometer to about 100 micrometers, or from about 200 nanometers to about 3 micrometers.
3. The device of feature 1 or feature 2, wherein the first and/or second two-dimensional materials are selected from the group consisting of molybdenum disulfide, tungsten disulfide, boron nitride, bismuth selenide, indium gallium arsenide, germanium, phosphorene, graphene, carbon nanotubes, molybdenum diselenide, gallium nitride, diamond, tungsten diselenide, molybdenum ditelluride, and combinations thereof.
4. The device of any of the preceding features, wherein the first and/or second two-dimensional materials are selected from transition metal dichalcogenides.
5. The device of any of the preceding features, wherein the first and second two-dimensional materials are configured as mosaic of the first and second two-dimensional materials.
6. The device of any of the preceding features, wherein the electromagnetic radiation is monochromatic, and a peak wavelength is identified.
7. The device of any of features 1-5, wherein the electromagnetic radiation is polychromatic, and two or more peak wavelengths are detected.
8. The device of any of the preceding features that is configured to use artificial intelligence to identify a spectral pattern of said electromagnetic radiation.
9. The device of feature 8, wherein the device is pre-trained using a set of different electromagnetic radiation sources having different spectral patterns.

10. The device of feature 8 or feature 9, wherein the wavelength band corresponds to a visible wavelength band or portion thereof, and the identified spectral pattern corresponds to a color.

11. The device of any of the preceding features, wherein the one or more detectors are each selected from the group consisting of a gamma ray detector, an X-ray detector, a UV/Visible detector, a photodetector, a photodiode, an IR detector, and a far infrared detector.

12. The device of any of the preceding features, wherein the wavelength band is in the gamma radiation spectrum, x-ray radiation spectrum, ultraviolet radiation spectrum, visible radiation spectrum, or infrared radiation spectrum.

13. The device of any of the preceding features, further comprising one or more of a wireless transmitter or transceiver, an output display, a battery, and a lens or other element for collecting, directing, focusing, or filtering electromagnetic radiation entering the device.

14. A plurality of devices of any of the preceding features configured as an array.

15. The plurality of devices of feature 14, configured as an imaging device.

16. The plurality of devices of feature 15, wherein the wavelength band of the individual devices corresponds to a visible wavelength band or portion thereof, and the plurality of devices provides a color image as output.

17. The device of any of features 1-13, or the plurality of devices of any of features 14-16, which is incorporated into a machine, robot, drone, color analysis device, self-driving vehicle, image recognition system, telescope, microscope, satellite, security system, spectrometer, detector, or artificial eye.

18. A method of identifying a wavelength of an electromagnetic radiation within a wavelength band, the method comprising:
 (a) providing the device of any of features 1-13, or the plurality of devices of any of features 14-16;
 (b) inputting the electromagnetic radiation into the device, whereby the radiation is transmitted through the first and second two-dimensional materials and then is detected by one of the one or more detectors, whereby first and second electrical signals are provided to the processor of the device; and
 (c) analyzing the first and second electrical signals, whereby the wavelength of the electromagnetic radiation is identified.

19. The method of feature 18, further comprising training an artificial neural network using a training set of electromagnetic radiation sources.

20. The method of feature 18 or feature 19, further comprising identifying a peak wavelength of a monochromatic electromagnetic radiation.

21. The method of any of features 18-20, further comprising identifying two or more peak wavelengths of a polychromatic electromagnetic radiation.

22. The method of any of features 18-21, further comprising identifying a spectral pattern of an electromagnetic radiation.

23. The method of any of features 18-22, further comprising identifying a color of an electromagnetic radiation.

24. The method of any of features 18-23, further comprising providing a spectral or color image output.

25. The method of any of features 18-24, further comprising use of a Bayesian model, a k-nearest neighbor model, an artificial neural network, a support vector machine, a least regression model, or a combination thereof.

As used herein, transition metal atoms include atoms of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

As used herein, chalcogen atoms include atoms of oxygen, sulfur, selenium, tellurium, and polonium.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

BRIEF DESCRIPTION OF THE DRAWINGS

FIG. 14A shows average absolute error of estimation in semi-log scale using all training data for test samples collected at the same time as the training data, compared to the test samples collected after one and two months. FIG. 14B shows third order polynomial functions fitted to the average transmittance of filters $f_1$ and $f_{11}$ over a period of ~400 days; scatter plots are the average measured transmittance values and the solid lines indicated the fitted functions. FIG. 14C shows average absolute error of estimating wavelength of test samples collected two months after training when no modification is applied to the model (black bars), and when the training sample-label pairs are corrected using drift functions (gray bars) in Bayesian and k-nearest neighbor models.

DETAILED DESCRIPTION

The present technology reduces the physical complexity of an accurate wavelength estimator applied to the electromagnetic spectrum. By combining two or more of the accurate wavelength estimators, large ranges of wavelength bands of the electromagnetic spectrum can be simultaneously monitored for incoming signals. The wavelength of incoming signals can be rapidly identified. The technology can utilize two or more materials to provide a device for identifying a wavelength of electromagnetic radiation within a wavelength band. A first material can have a first wavelength dependent transmittance over a wavelength band of the electromagnetic spectrum. A second material can have a second wavelength dependent transmittance over the wavelength band of the electromagnetic spectrum. The first and second materials can be used separately as electromagnetic radiation "filters". The first and second materials can be combined in various ratios to provide additional wavelength dependent transmittance over the wavelength band. Additional materials can be utilized and additional detectors can be added.

Figure 5A:
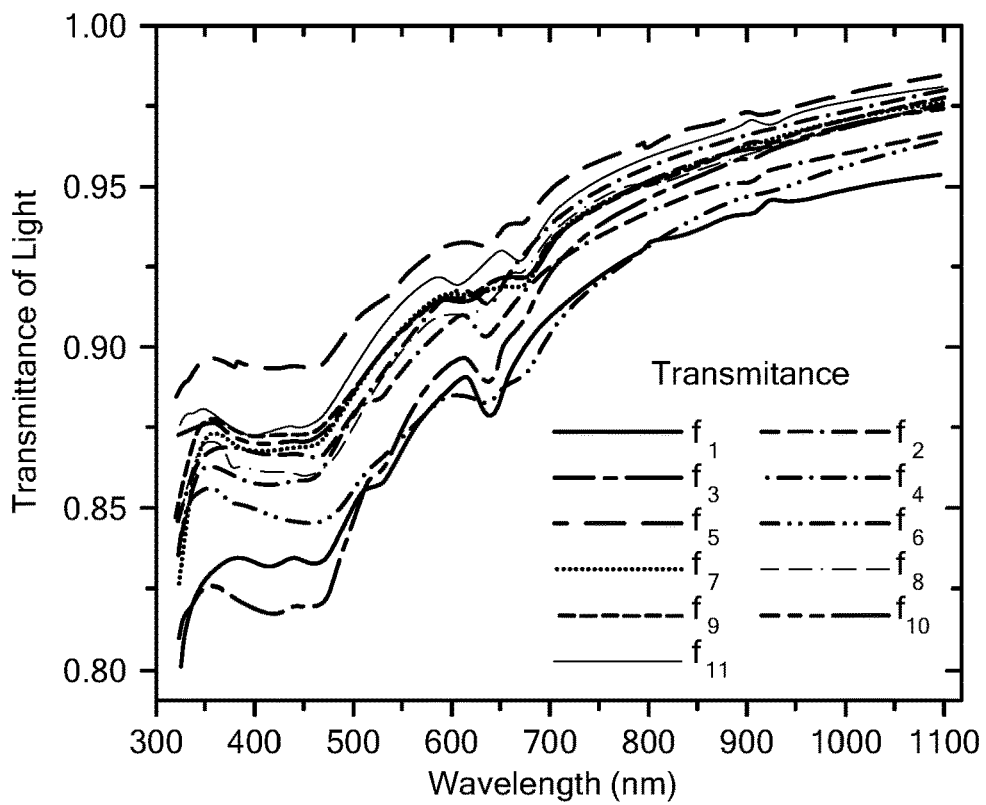
FIG. 5A shows background subtracted transmittance versus wavelength for all the 11 filters ($f_1$-$f_{11}$) that are shown in FIG. 2A.
Figure 5B:
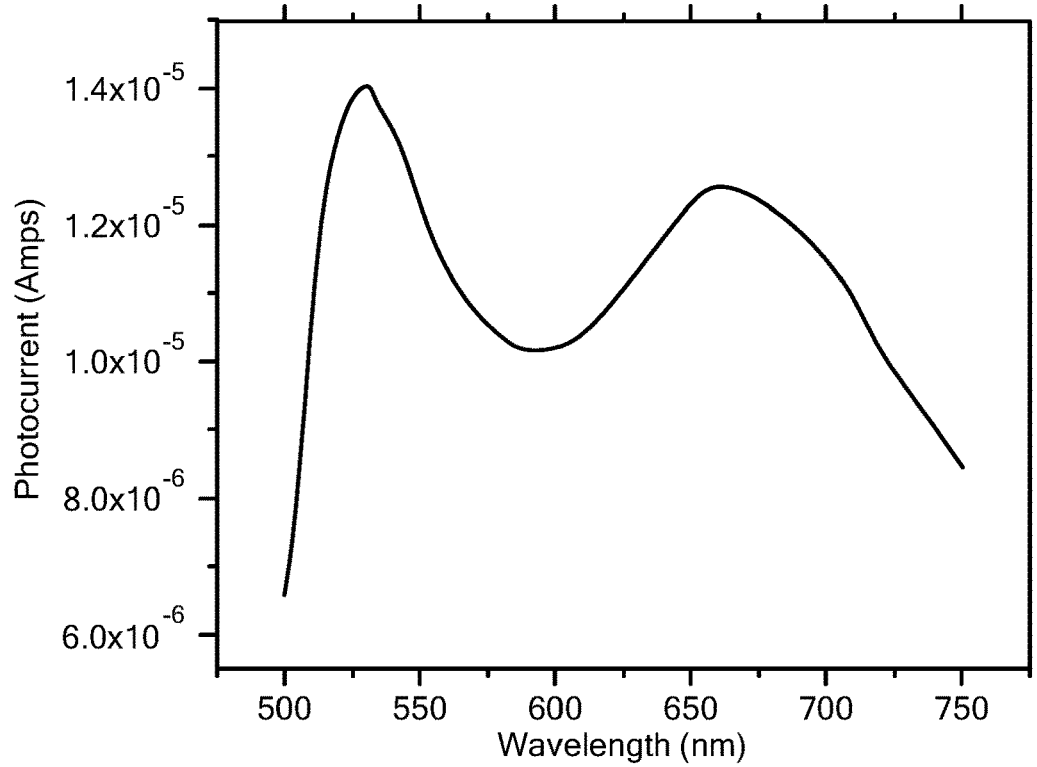
FIG. 5B shows photocurrent versus wavelength for a silicon photodetector for individual monochromatic lights.

One or more detectors capable of detecting electromagnetic radiation over the wavelength band of the electromagnetic spectrum are used with the two or more materials. The one or more detectors can be low cost and do not require specific wavelength resolution or a flat frequency response. For example, FIG. 5B shows a photocurrent measurement from a silicon photodetector for individual lights over about 500 nm to 750 nm, which can be used to calculate the responsivity of the specific detector. After configuring the device, a machine learning approach is utilized to train the device for identifying a wavelength of electromagnetic radiation to provide a high-accuracy estimation of wavelengths of sources of electromagnetic radiation, thereby providing a cyber-physical wavelength estimator.

For example, if two detectors are used, the incoming electromagnetic radiation penetrates the first material and reaches the first detector. The first detector provides a first electrical signal. Simultaneously, the incoming electromagnetic radiation penetrates the second material and reaches the second detector. The second detector provides a second electrical signal. The first and second electrical signals are processed by the trained machine learning algorithm, which quickly provides the wavelength of electromagnetic radiation over a wavelength band. Various trained machine learning algorithms can be utilized. Additional detectors and materials can be used to improve accuracy. If only one detector is used, the incoming electromagnetic radiation can penetrate the first material and reach the detector, which provides a first electrical signal. The second material can then be positioned so that the incoming electromagnetic radiation can penetrate the second material and reach the detector, which provides the second electrical signal.

The range of electromagnetic waves covered over the wavelength band depends on the materials used for the two or more materials. For example, $Bi_2Se_3$, InGaAs, Ge, nanoscale black phosphorus, nano-graphite, and a range of carbon nanotubes have smaller band-gaps and can cover deeper into the infrared regions of the electromagnetic spectrum. Within the UV-vis-NIR region, various plasmonics, metamaterials, and other photonic techniques may be applied in addition to the large number of materials that are known to transmit and to have a degree of wavelength dependent transmittance. To cover high energy electromagnetic waves including far UV and extreme UV regions, materials with larger band gaps, for example, GaN, hBN, and diamond can be used. For ionizing higher energy electromagnetic waves including X-rays and gamma rays, it is possible to use thin films of materials that absorb in the X-ray or gamma ray regions. Any suitable material can be utilized in front of conventional detectors to collect the required data to cover the desired wavelength band of the electromagnetic spectrum. The technology of using a machine learning approach to train the device to provide a high-accuracy estimation of wavelengths of sources of electromagnetic radiation remains the same. The technology can make use of wavelength dependent transmittance (e.g., a curved or non-flat frequency absorbance).

For example, nanomaterials can have inherent variabilities in transmittance but can provide useful transmittance ranges greater than a range of about 1000 nm. Due to the inherent variabilities, nanomaterial based sensors are challenging to translate into real world applications, where reliability and reproducibility is the key. Transition metal dichalcogenides are considered to be among the leading candidates in electromagnetic radiation sensing applications. Transition metal dichalcogenide monolayers can be atomically thin semiconductors of the type $MX_2$, with M a transition metal atom and X a chalcogen atom. In the monolayer, one layer of M atoms is sandwiched between two layers of X atoms. Transition metal dichalcogenide monolayers, for example, of $MoS_2$, $WS_2$, $MoSe_2$, $WSe_2$, and $MoTe_2$ have a direct band gap and can be used in electronics as transistors and in optics as emitters and detectors. Many of these nanomaterials are low cost and are easy to fabricate into electromagnetic spectral filters. The variations, for example variations in transmittance (non-flat), in nanomaterial properties are usually considered as noise. Various experimental or statistical approaches are often pursued to reduce these variations or to capture useful target data from noisy measurements (e.g., improve signal to noise).

Figure 1:
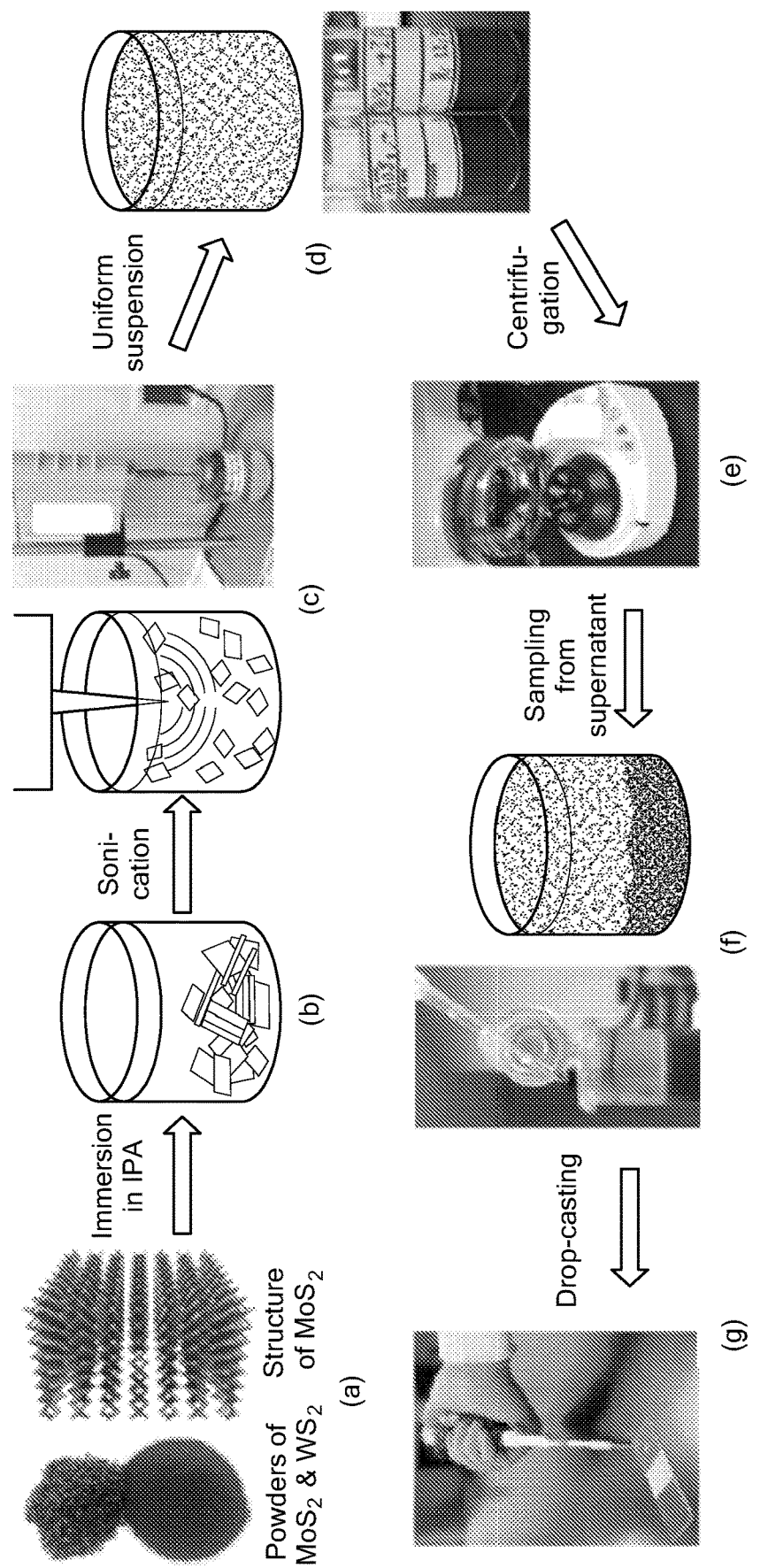
FIG. 1 shows an example of a drop-casting method for making filters including two-dimensional materials.

An array of nanomaterial filters can be fabricated, for example, using solution-processed nanomaterials. Suitable nanomaterials include semiconducting transition metal dichalcogenides, such as molybdenum disulfide ($MoS_2$) or tungsten disulfide ($WS_2$) made using liquid-phase exfoliation. However, any type of nanomaterial synthesis technique can be employed and any type of materials can be used to fabricate the nanomaterials. After fabrication, the nanomaterials can be drop-cast on a transparent substrate, such as a surface of a glass microscope slide, to create thin films for filters. Other transparent substrates can also be used. As depicted in FIG. 1, a transition metal dichalcogenide (a) can be immersed in a liquid (b) and sonicated (c) to provide a uniform suspension (d). After a uniform suspension is formed, centrifugation (e) or other suitable method, for example settling or sedimentation, can be utilized to provide a consistent suspension which can then be sampled (f). After sampling, the relative concentration of the suspension can measured using absorbance to equalize the suspension compared to suspensions of other materials.

For example, a suspension of $MoS_2$ can be brought to about the same concentration as a suspension of $WS_2$ by diluting which is the more concentrated suspension. An amount of the suspension can be drop cast on a transparent substrate (g). The number of drops for each glass slide can be kept the same to create almost the same thickness and area of drop-casted materials on glass. One glass slide can be 100% $MoS_2$. One glass slide can be 100% $WS_2$. The suspension of $MoS_2$ can be gradually added to the suspension of $WS_2$ to produce an array of glass slides with varying amounts of $MoS_2$ and $WS_2$. After making the array, the solvent can evaporate, and the entire array of slides with the nanomaterials can be annealed in nominal vacuum for about 12 hours to stabilize and eliminate any trace of solvent.

Figure 2A:
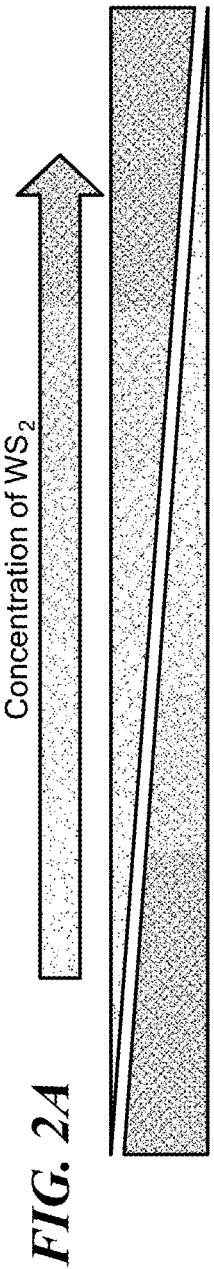
FIG. 2A shows an image of eleven filters (shown as $f_1$-$f_{11}$) drop-cast on glass slides with an illustration of the different $WS_2$ and $MoS_2$ content of the filters at the top of FIG. 2A.
Figure 2D:
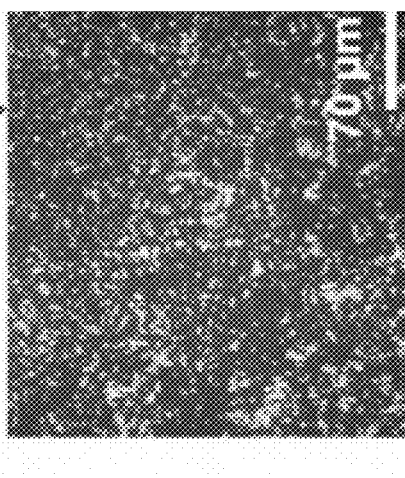
FIG. 2D shows a microscope image of filter $f_1$ (100% $MoS_2$); the scale bar at lower right is 70 μm.
Figure 2C:
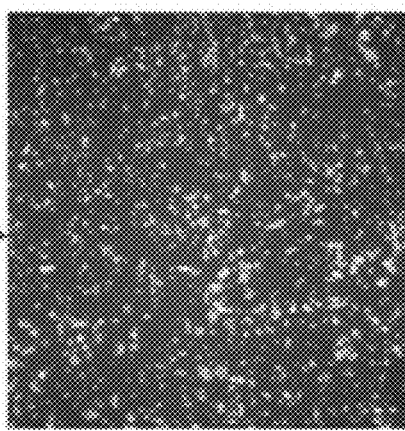
FIG. 2C shows a microscope image of filter $f_6$ (about 50% $WS_2$ and 50% $MoS_2$)
Figure 2B:
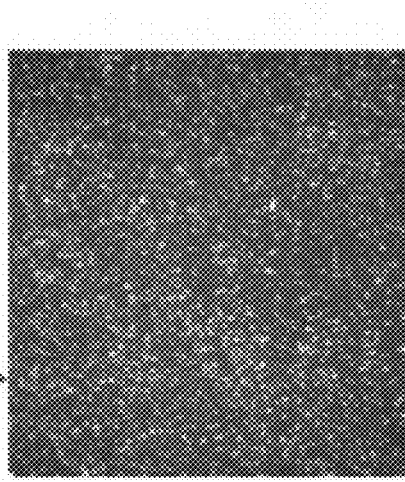
FIG. 2B shows a microscope image of filter $f_{11}$ (100% $WS_2$).

An array of nanomaterial filters is shown in FIG. 2A. At the far right of FIG. 2A, 100% $WS_2$ (shown as $f_1$) is shown with a gradual addition of $MoS_2$ and reduction of $WS_2$ in steps of 10% to create new combinations (moving right to left for $f_2$, $f_3$, $f_4$, $f_5$, $f_6$, $f_9$, and $f_{10}$) and finally reaching 100% $MoS_2$ for $f_{11}$ at the far left of FIG. 2A. Altogether the 11 of such combinations shown in FIG. 2A can be made and stored in separate sealed containers. FIGS. 2B-2D show microscope images of filter $f_{11}$, filter $f_6$, and filter $f_1$.

Figure 3A:
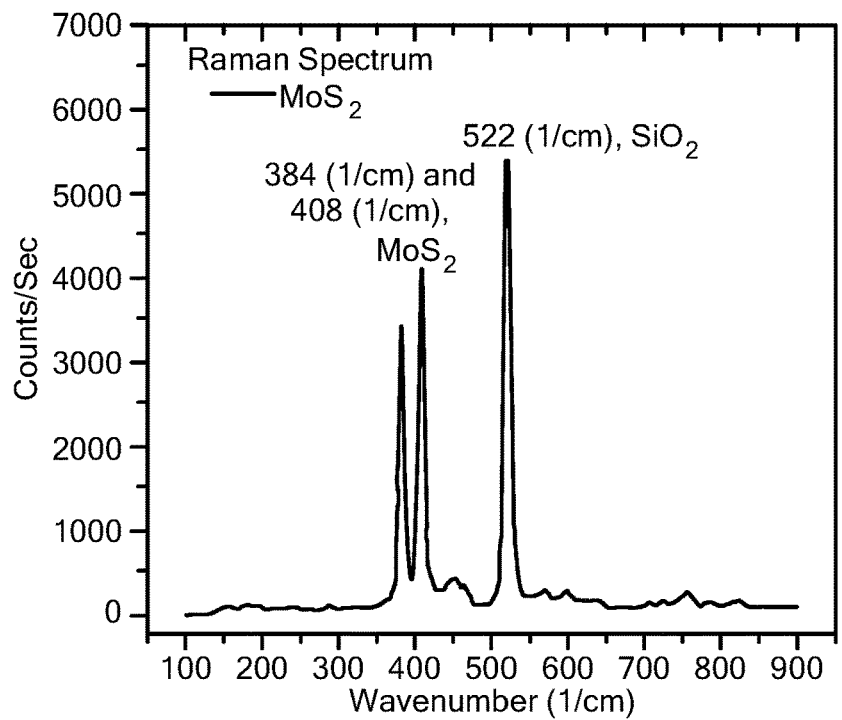
FIG. 3A shows a Raman spectrum of the $MoS_2$ nanomaterials on a silicon dioxide substrate.
Figure 3B:
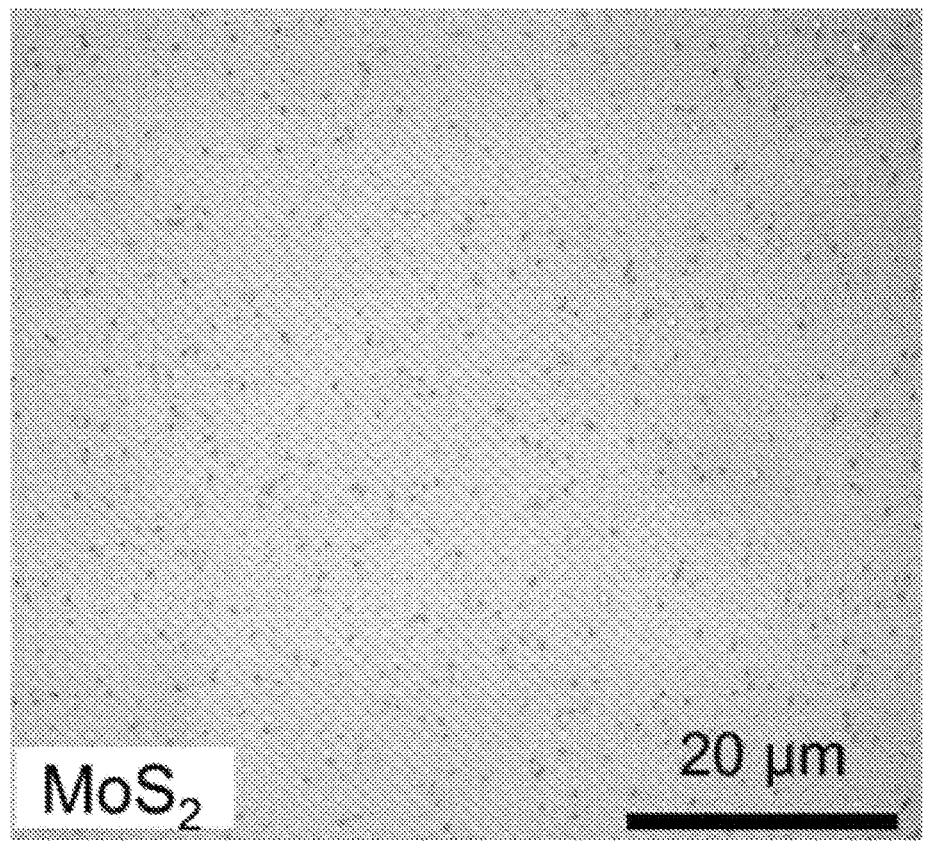
FIG. 3B shows a microscope image of the $MoS_2$ nanomaterials on a silicon dioxide substrate; the scale bar at lower right is 20 μm.
Figure 3C:
FIG. 3C shows an SEM image of the $MoS_2$ nanomaterials on a silicon dioxide substrate; the scale bar at lower right is 200 nm.
Figure 3D:
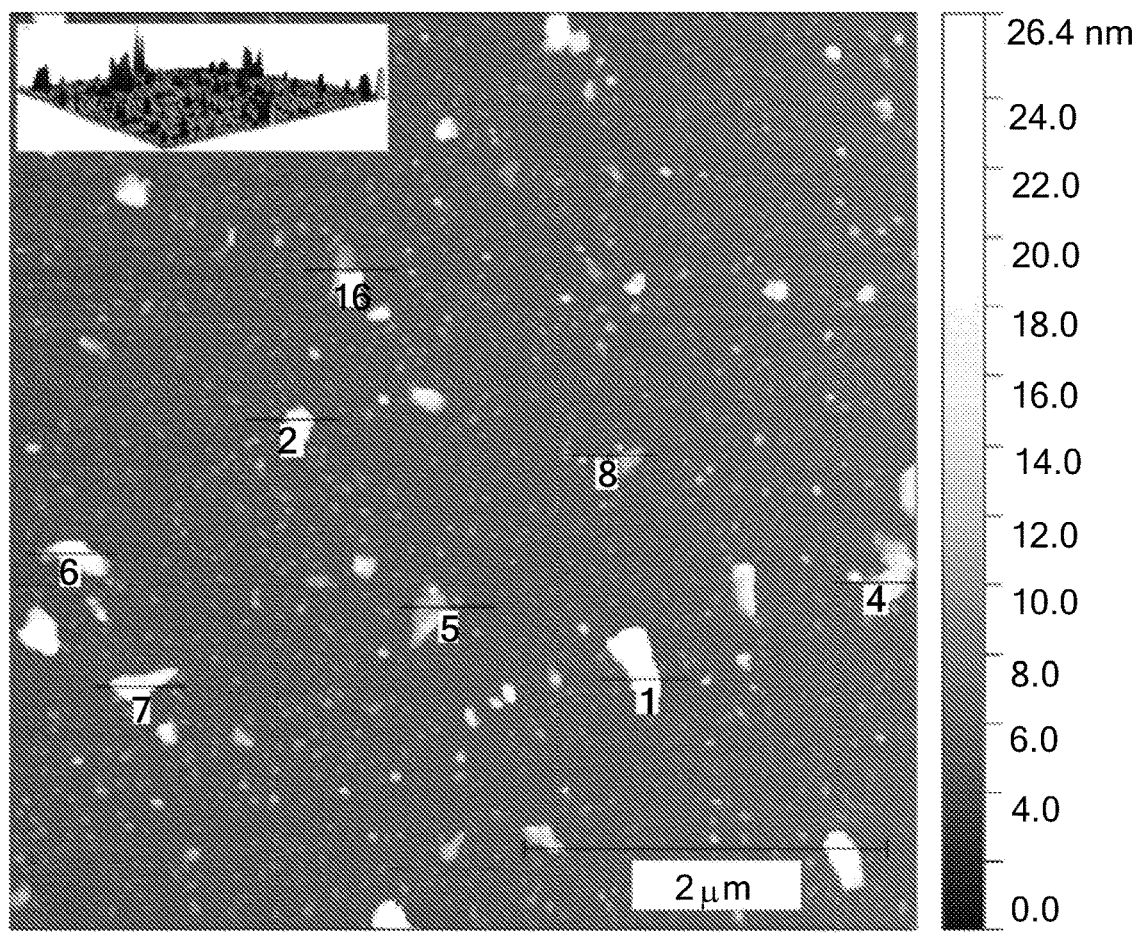
FIG. 3D shows an atomic force microscopy (AFM) image of the $MoS_2$ nanomaterials on a silicon dioxide substrate.
Figure 3E:
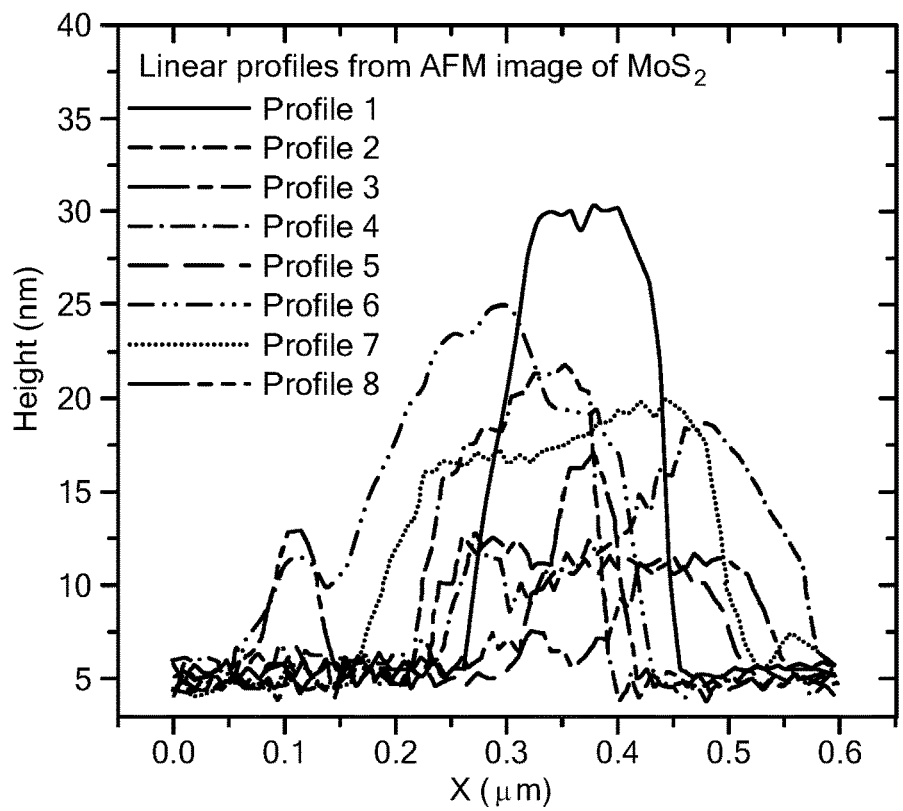
FIG. 3E shows linear AFM profiles taken over the nanomaterials at positions where the small horizontal lines are indicated in FIG. 3D.
Figure 4A:
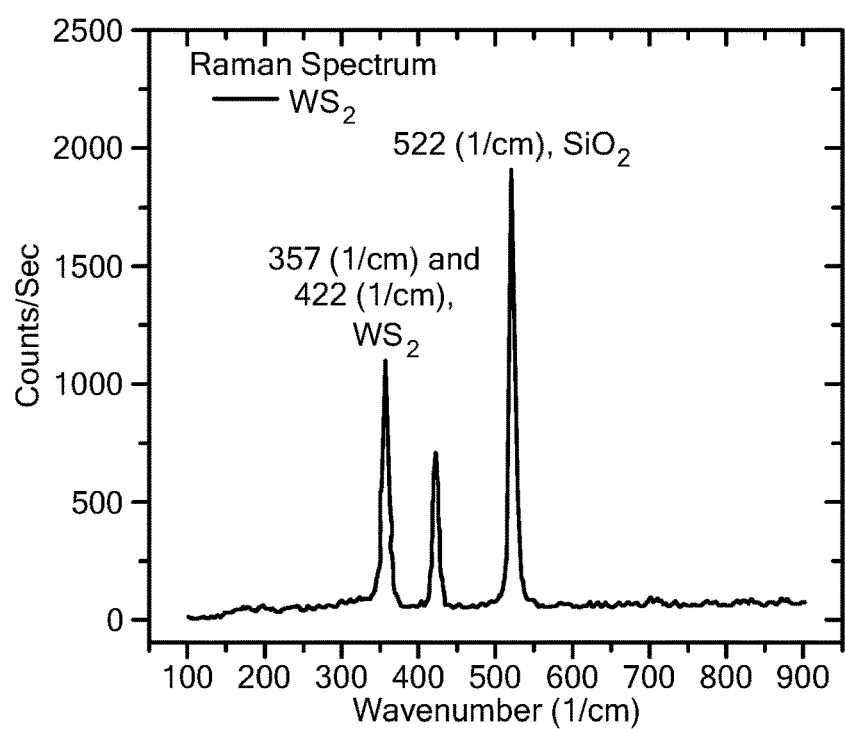
FIG. 4A shows a Raman spectrum of the $WS_2$ nanomaterials on a silicon dioxide substrate.
Figure 4B:
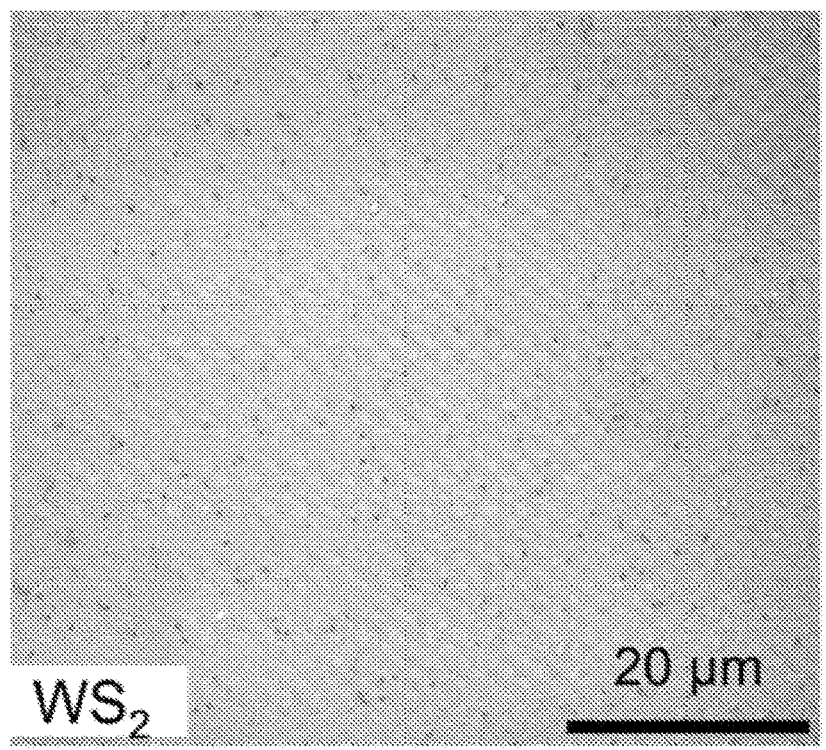
FIG. 4B shows a microscope image of the $WS_2$ nanomaterials on a silicon dioxide substrate; the scale bar at lower right is 20 μm.
Figure 4C:
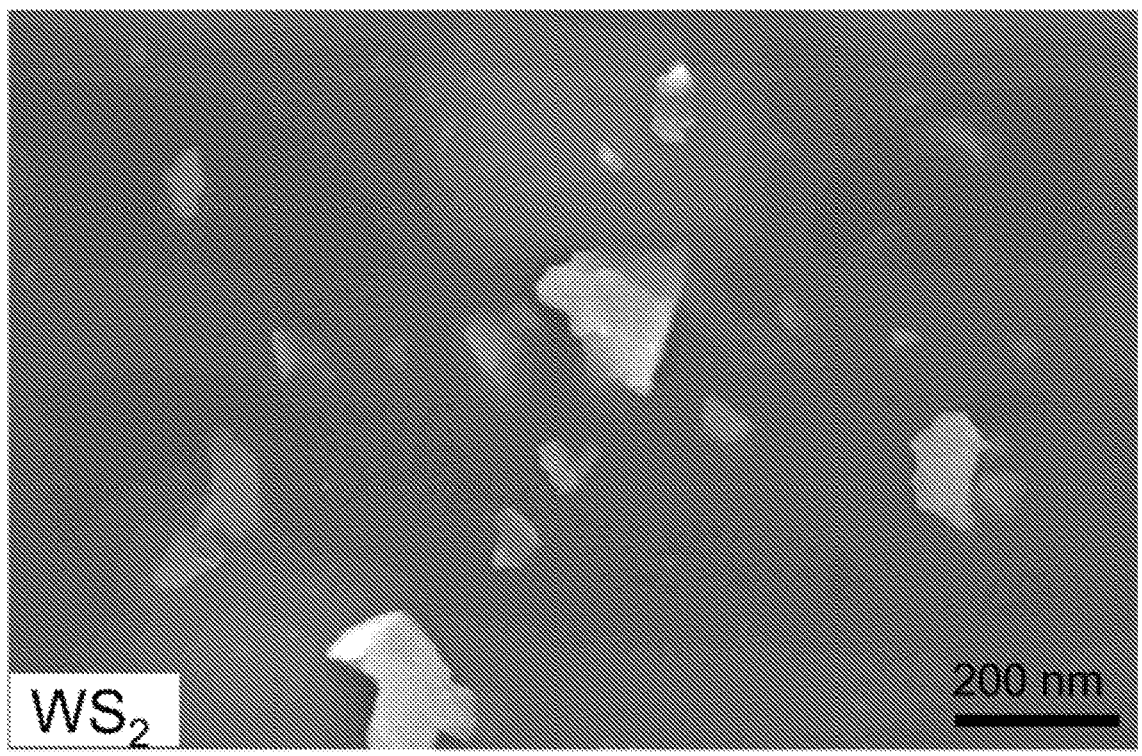
FIG. 4C shows an SEM image of the $WS_2$ nanomaterials on a silicon dioxide substrate; the scale bar at lower right is 200 nm.
Figure 4D:
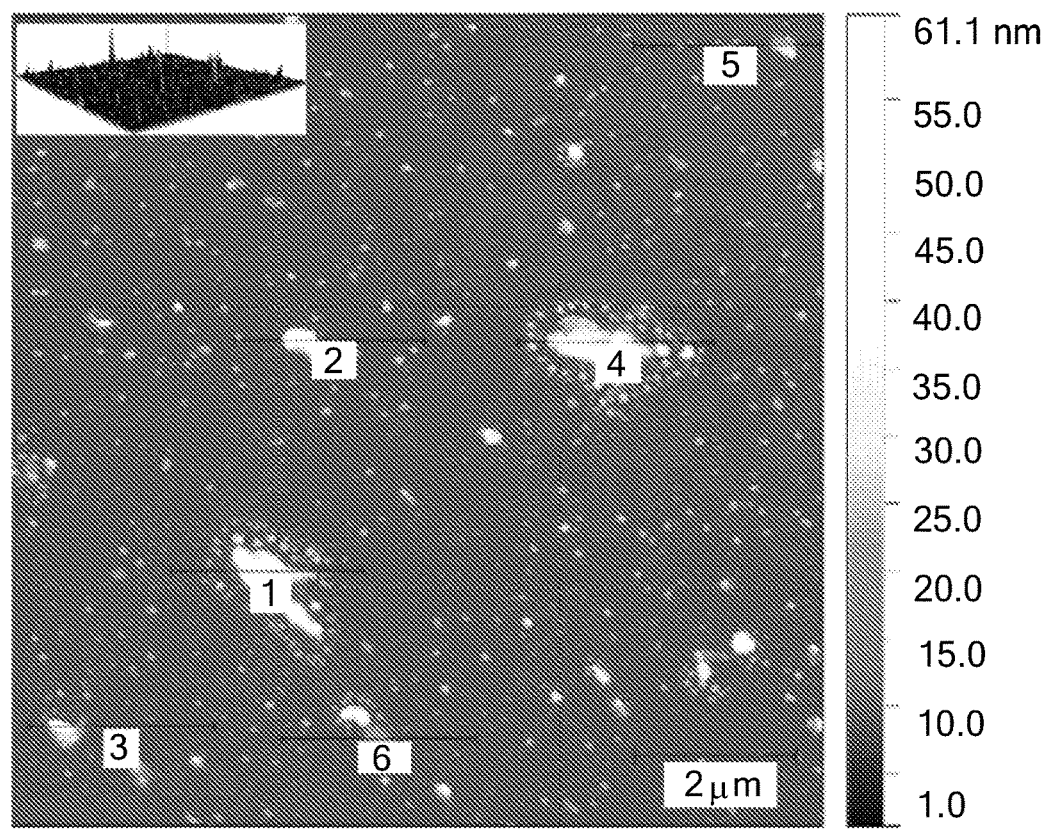
FIG. 4D shows an AFM image of the $WS_2$ nanomaterials on a silicon dioxide substrate.
Figure 4E:
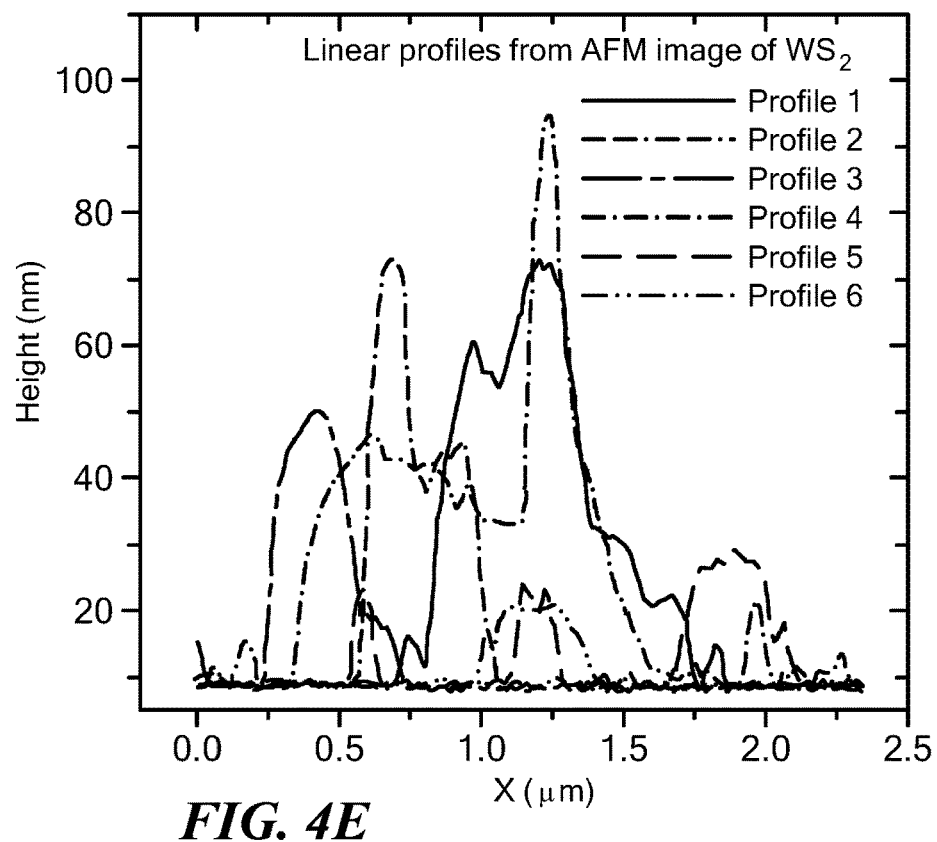
FIG. 4E shows linear AFM profiles taken over the nanomaterials at positions where the small horizontal lines are indicated in FIG. 4D.

Various methods can be used to fabricate filters, and high quality samples are not required. Raman spectra and microscope images (for the exfoliated materials) are shown for the $MoS_2$ (FIG. 3A, FIG. 3B) and for the $WS_2$ (FIG. 4A, FIG. 4B). The SEM image of the $MoS_2$ (FIG. 3C) and the SEM image of the $WS_2$ (FIG. 4C) both show that the nano-flakes are about 10-50 nm thick at most and their surface is several times larger than that. The nano-flakes are small, but they are not mono-layers for the most part, which indicates a device for identifying a wavelength of electromagnetic radiation within a wavelength band does not depend on high quality samples. Atomic force microscopy images of the $MoS_2$ nanomaterials (FIG. 3D, FIG. 3E) and the $WS_2$ (FIG. 4D, FIG. 4E) do not support a single layer of material. The drop-casting technique produced suitable filters and is not difficult for fabrication.

Figure 7A:
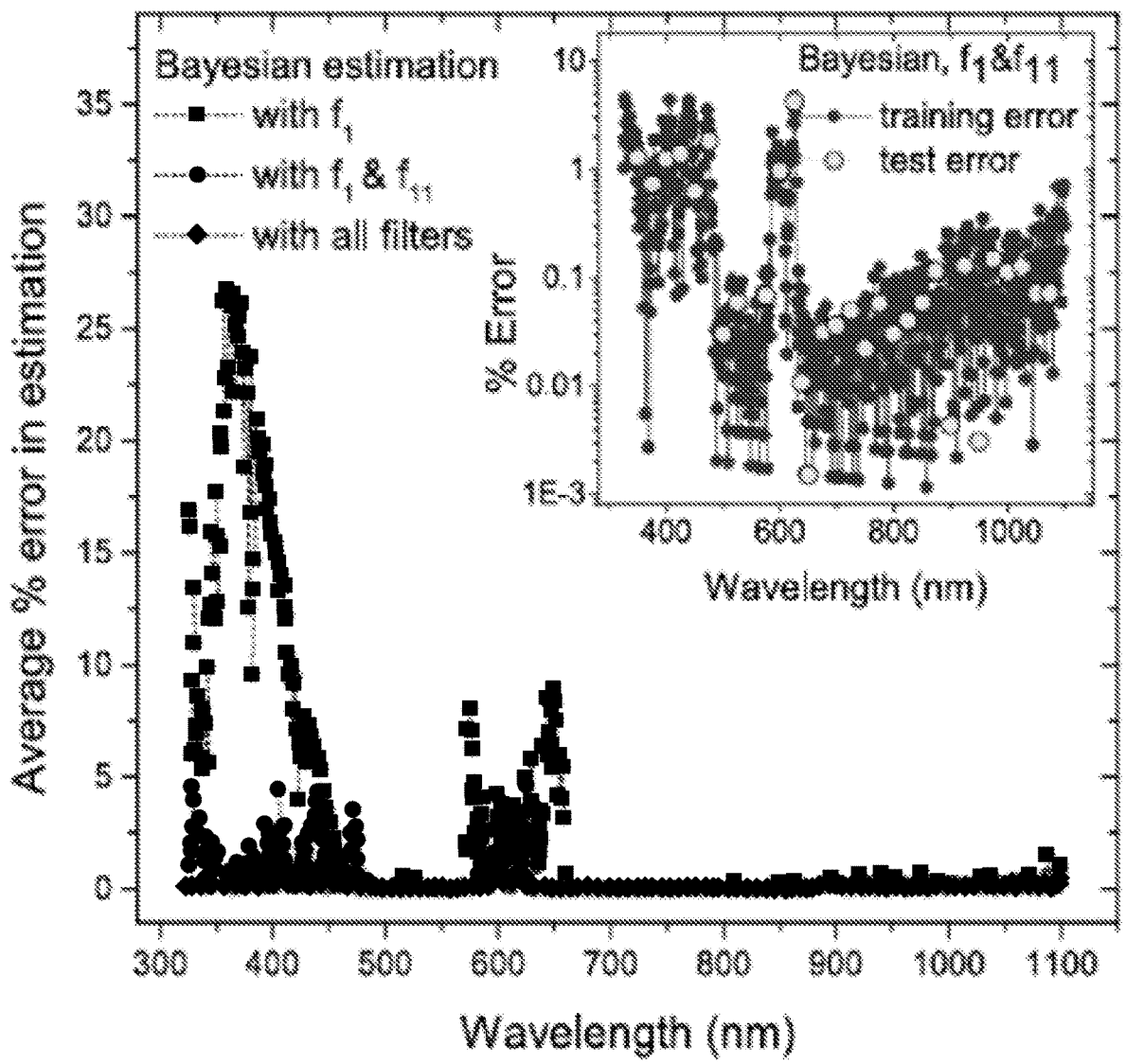
FIG. 7A shows average training error percent of a Bayesian estimation by using one filter (filter $f_1$), two filters ($f_1$ and $f_{11}$), and all 11 filters.
Figure 7B:
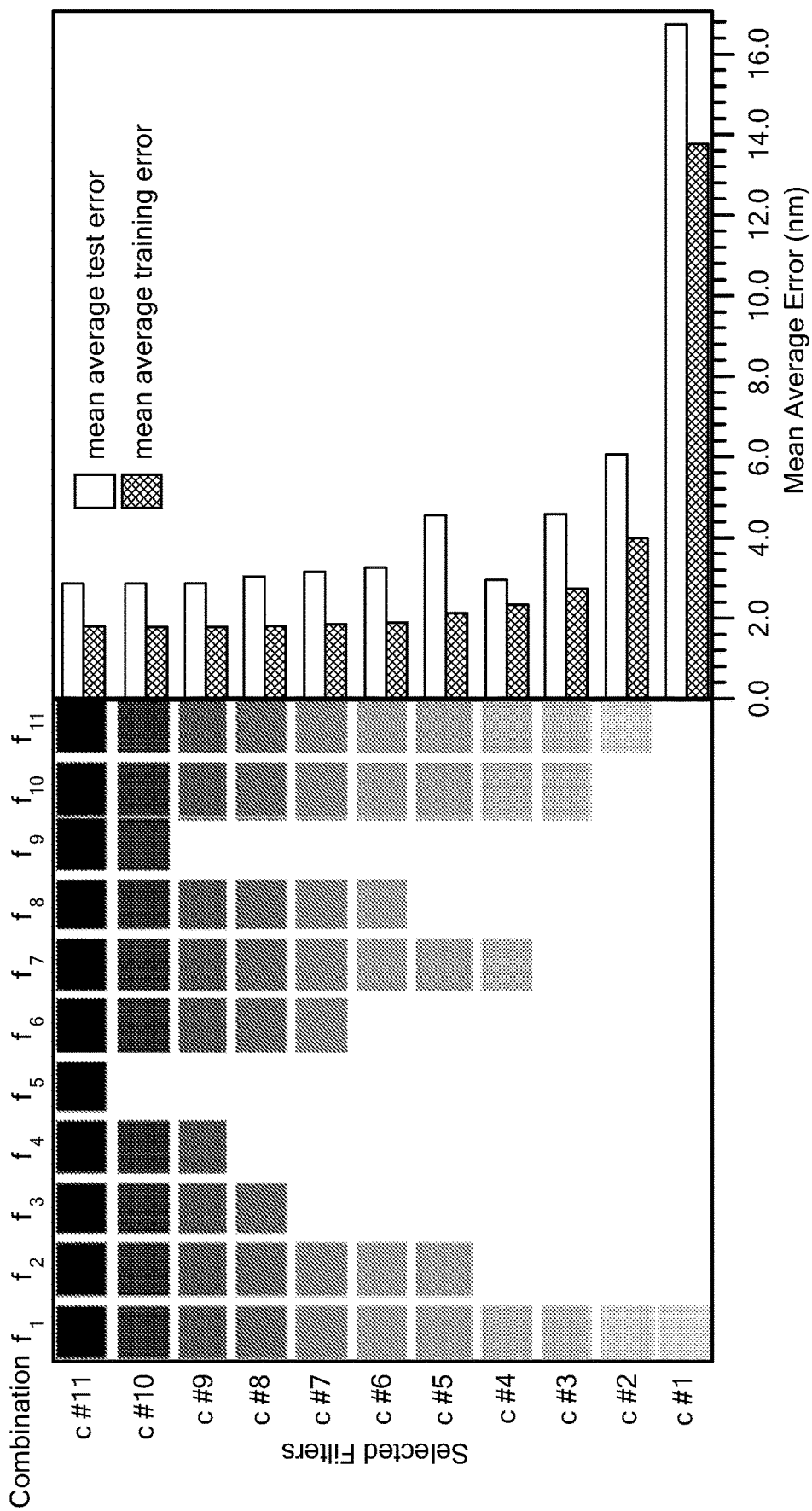
FIG. 7B shows filter selection via a Greedy algorithm: at left, the horizontal dark-gray blocks represent the vector of chosen filters to use wherein a white block means no filter was used, and the corresponding lighter gray-darker gray pairs of bars on the right show the mean average test or training error when the chosen filters are used for the Bayesian estimation.

Generally, when a detector for a specific region of the electromagnetic spectrum is desired, materials that have suitable transmission in that region can be selected. Published transmission spectra, material properties (e.g., band gaps, absorbance, chemical bonds in proposed materials), and materials known in the art to be used in that region should be examined. For example, a place to start can be to look at materials that are used in the art for transmission sample holders, for beam splitters, and for focusing or manipulation of electromagnetic radiation in that region of the electromagnetic spectrum. If transmission spectra for the materials are available, monotonic absorbance or wavelength dependent transmittance (e.g., a curved or non-flat frequency absorbance) can be identified by studying the transmission spectra. Once suitable target materials are found, filters can be fabricated and tested. If possible, the filters can be fabricated without a background substrate, to avoid the need for background subtraction of the substrate. The thickness of the filters should provide transmittance through the filters. The materials selected should have at least some differences in transmission spectra (e.g., see FIG. 5A). If needed, the materials selected can be provided in a mosaic on a substrate as is done in the example of $MoS_2$ and $WS_2$. Layers of the materials in different thicknesses can be used. Mixing two different materials in different amounts can enable acquisition of gradually evolving transmittance curves with changing magnitudes, slopes, and feature positions. The number of filters fabricated can be determined by the required accuracy, as is discussed in the use of the Greedy algorithm below (FIG. 7B).

Figure 5C:
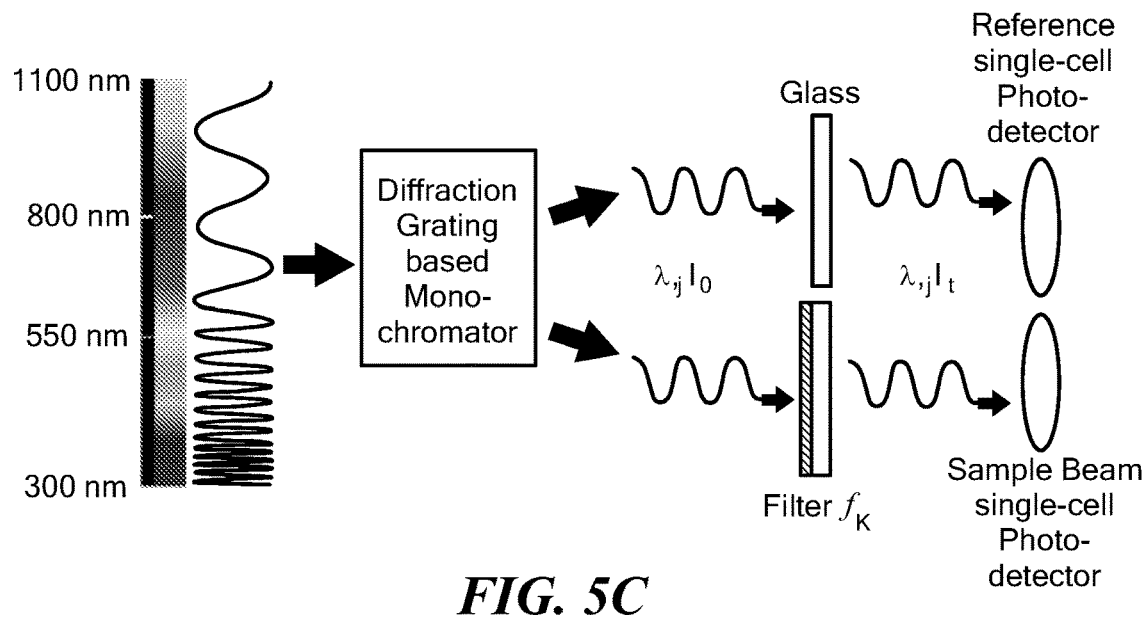
FIG. 5C shows a schematic of transmittance measurement as measured inside a UV-vis-NIR spectrometer for background correction.

The array of nanomaterials filters ($f_1$-$f_{11}$) shown in FIG. 2A provide a transmittance over a range from about 325-1100 nm. The background subtracted transmittance can be acquired by placing a filter into a spectrometer as depicted in FIG. 5C, wherein a glass slide provides the background, which is subtracted from the spectrum for a filter $f_k$, where 'k' is the number of the filter measured. For example, by placing one filter at a time in a UV-vis-NIR spectrometer, the transmittance versus wavelength with respect to a clean glass slide can be collected 120 times for each filter. The same 120 spectra measurement can be performed for all 11 filters, which makes 120×11=1320 spectra in total. The incident power does not necessarily need to be measured or controlled at any step. This acquired data set can be used as "training data" to build a statistical model for machine learning. The mean values for the background-subtracted transmittance versus wavelength for all 11 filters is shown in FIG. 5A. As shown in FIG. 5A, the excitonic peaks get modified gradually moving from filter $f_1$ to filter $f_{11}$ as a result of the changing proportion of mixing the two transition metal dichalcogenides during production of the filters. As shown in FIG. 5A, the transmittance of each of the 11 filters is different. The transmittance spectra can be utilized to train a machine learning model to thereafter identify an arbitrary wavelength passing through the materials and reaching a detector. Examples of machine learning models that can be utilized are a Bayesian model, a k-nearest neighbor model, an artificial neural network, a support vector machine, a least regression model. Once the filters are prepared and the machine learning model is trained, detection of an arbitrary wavelength can be done.

If a region outside of the UV/visible region is utilized, a suitable spectrometer for the region of the electromagnetic spectrum can be used to acquire transmittance spectra of the filters. The transmittance spectra can be background subtracted if the filters include a substrate. The transmittance spectra can be electronically stored. The machine learning techniques herein can then be applied to the spectra.

To collect "test samples" to test the detection of an arbitrary wavelength, the single wavelength mode of a UV-vis-NIR spectrometer, rather than the spectrum sweep mode, can be used to collect 100 transmittance values for each of the 11 filters at an arbitrary wavelength. Each sample is a vector of 11 transmittance values, one per filter. In each case (see FIG. 5A), the overall transmittance values are found to grow with increasing wavelength of incident light corresponding to the gradually reducing density of states near the Fermi level of these materials with growing wavelength (or decreasing energy values) tending toward zero close to the band gap. In addition, there are characteristic "dip" features (~650 nm region in FIG. 5A) that correspond to various excitonic resonances in these systems. Mixing two different transition metal dichalcogenides in different amounts can enable acquisition of gradually evolving transmittance curves with changing magnitudes, slopes, and feature positions. This can allow examination of which features of the transmittance curve are responsible for higher wavelength estimation confidences.

Wavelength Estimation Using Bayesian Inference

The statistical analysis of the data can be performed over the mentioned set of transmittance values measured discretely over the entire mentioned range of wavelengths, for each filter, as well as 120 repetitions of wavelength-dependent data. The repeated data are acquired to account for drifts, fluctuations, and other variations commonly observed in physical measurements especially in nanomaterial-based systems, which tend to be sensitive to their environments. The filters are not chemically independent from each other, but for computational purposes independence between their outcomes is assumed. Using these data termed the "training data" (e.g., FIG. 5A), the wavelength estimation problem can be formulated as follows: Let $\Lambda=\{\lambda_1, \ldots, \lambda_i, \ldots, \lambda_N\}$ be N different wavelengths in the desired spectral range and with specified granularity (i.e., 325-1100 nm with 1 nm step) and $T=\{t_1, \ldots, t_i, \ldots, t_K\}$ be the transmittance vector of K filter values (i.e., K=11 when all of the filters are used). Employing the Bayesian inference, the probability of the incoming monochromatic light having the wavelength $\lambda_j$ based on the observed/recorded transmittance vector T data is called the posterior probability $P(\lambda_j|T)$, which is the probability of a hypothesis given the observed evidence (conditional probability of having wavelength $\lambda_j$ given transmittance T, an 11 valued vector):

$$P(\lambda_j | T) = \frac{p(T | \lambda_j)P(\lambda_j)}{P(T)} \quad (1)$$

where $P(\lambda_j)=1/N$ is the prior probability defined as the estimate of the probability of the hypothesis before the current evidence is observed, which is a uniform weight function here since all of the wavelengths are equally likely to happen; N is the total number of quantifiable wavelengths in the range under study. Moreover:

$$P(T|\lambda_j)=\Pi_{k=1}^{K}P(t_k|\lambda_j) \quad (2)$$

is the probability of observing transmittance data T given wavelength $\lambda_j$ and is called the likelihood, which indicates the compatibility of the evidence with the given hypothesis, or in other words it is the probability of having transmittance vector T if wavelength is $\lambda_j$. Although, the filters are related due to having the same two materials with different mixtures, for computational purposes, it is assumed independence between their outcomes and they are modeled with the Naive Bayes algorithm. As such, the likelihood of all filter readings T can be calculated as the product of each filter value $t_i$ in a given wavelength $\lambda_j$. To compute individual $P(tk|\lambda_j)$ values, a Gaussian normal distribution for each filter at each wavelength is assumed, and their mean values and standard deviations are calculated from the training data (i.e., the 120 measured transmittance spectra in FIG. 5A) collected from each filter at each wavelength. P(T) is called the marginal probability of measured transmittance vector T, which can be calculated as:

$$P(T) = \sum_{i=1}^{N} P(T|\lambda_i)P(\lambda_i) \quad (3)$$

Because P(T) is the same for all possible hypotheses that are being considered, it acts as a normalization factor to keep the posterior probability in the range of 0-1. Finally, given the measured transmittance sample T (a vector of K elements-one transmittance value per filter at an unknown wavelength), the target wavelength $\lambda^*$ of the incoming monochromatic (narrow-band) light is estimated by choosing the value of $\lambda_j$ that maximizes the posterior probability $P(\lambda_j|T)$:

$$\lambda^* = \underset{\lambda_j}{\operatorname{argmax}} P(\lambda_j | T) \quad (4)$$

in which this optimization is called the maximum a posteriori (MAP) estimation. To clarify the estimation steps further, it should be considered that for each wavelength there is a set of 11 transmittance values, one per filter. For the incoming unknown narrow-band light the transmittance of light is measured with respect to each of the filters. The posterior probability at each wavelength is the probability that the measured 11 transmittance values combined for test light belong to that wavelength. The posterior probability is very small for most of the wavelengths and becomes large when it gets to the real wavelength of the incoming light, which according to the MAP estimation the wavelength that makes the posterior probability to be maximum is indeed the target wavelength.

Figure 6A:
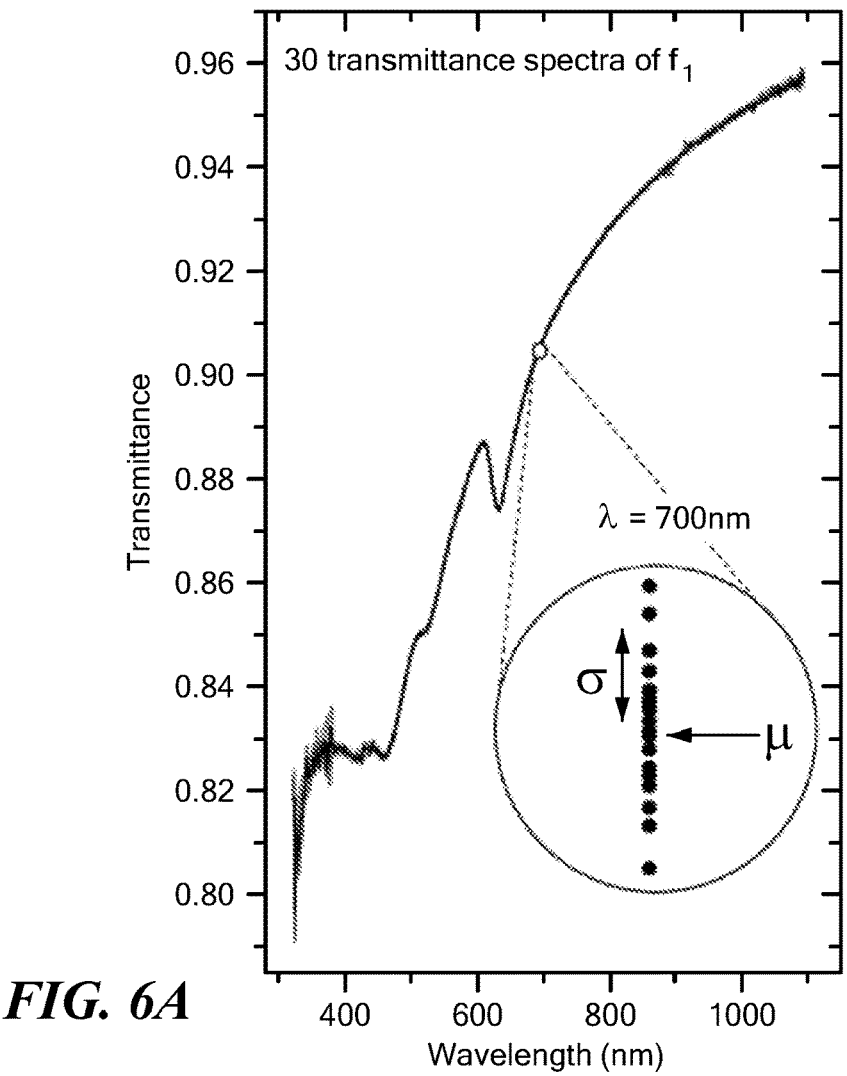
FIG. 6A shows transmittance spectra of filter $f_1$ measured 30 separate times, such that each point on the curve shown is actually 30 dots as shown for 700 nm in the circle inset.
Figure 6B:
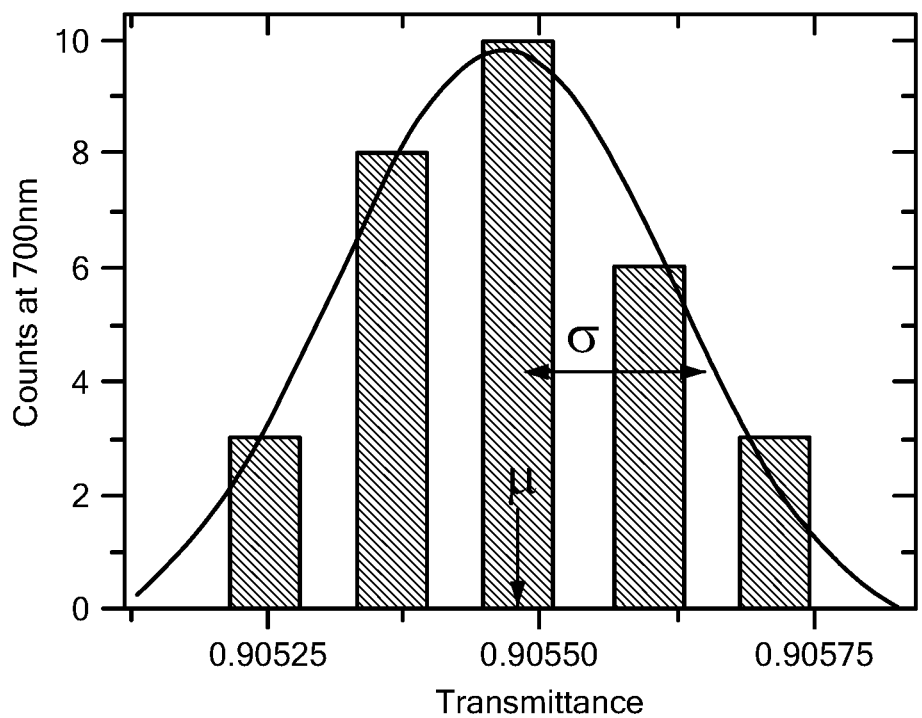
FIG. 6B shows a histogram of the same 30 transmittance data of $f_1$ at 700 nm in the circle inset of FIG. 6A; the curve shows a Gaussian function fit to the data.
Figure 6C:
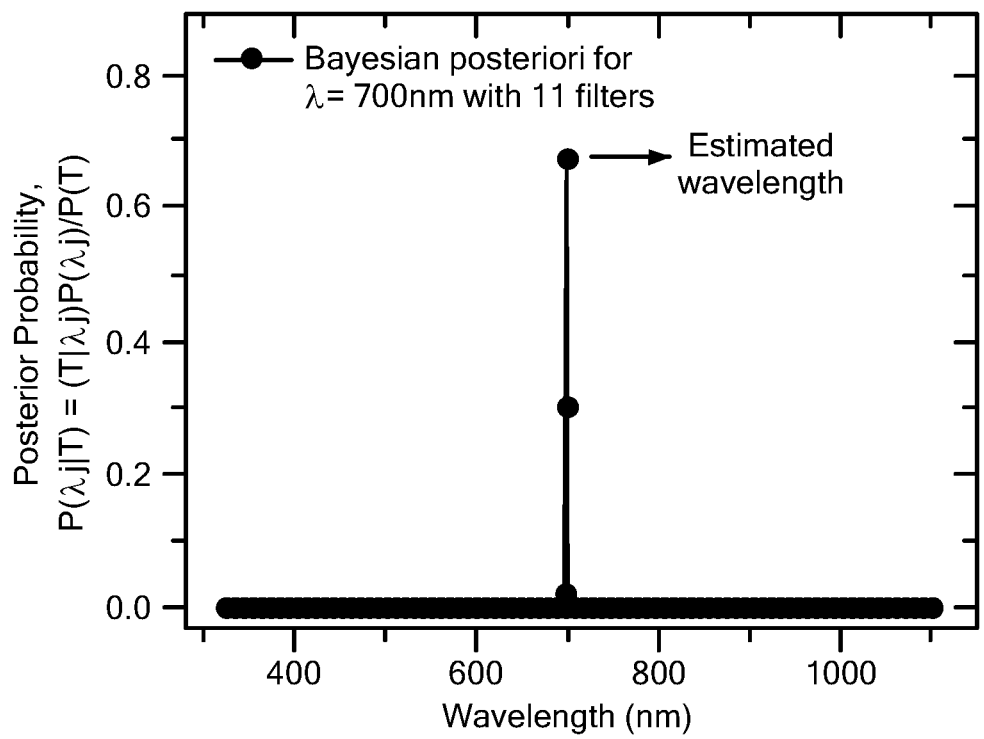
FIG. 6C shows the posterior probability calculated by using a Bayesian inference applied on transmittance data collected from the 11 filters shown in FIG. 2A when a test 700 nm monochromatic light was shined on them.

The efficacy of the wavelength estimator can be tested by using both test samples, i.e., transmittance values for a test monochromatic source that are collected separately, and which were not used in the training data and hence were not seen by the model before, and training samples which were generated randomly from the same Gaussian distributions that were assigned to each wavelength for each filter. The training samples are utilized to check how well the model works on the training set itself, while the test samples are used to investigate how the model can estimate the truly unknown wavelengths. FIGS. 6A-6D provide an example of applying Bayesian inference for estimating the wavelengths. FIG. 6A plots 30 instances of overlapping transmittance spectra of the filter $f_1$, with the inset showing a magnified view of the transmittance data set for a single wavelength (shown here for $\lambda$=700 nm), the collected transmittance values creating a distribution around the mean value of transmittance for that wavelength. FIG. 6B shows the histogram of the same 30 recorded transmittance data of $f_1$ at 700 nm with the calculated mean μ at center and standard deviation σ. The curve at top shows the Gaussian fit on the data, which justifies the assumption of a normal distribution for the $P(t_k|\lambda_j)$ probabilities. To perform Bayesian inference for wavelength estimation of a test sample of monochromatic light, it is necessary to calculate the posterior probabilities of different wavelengths $P(\lambda_j|T)$, when transmittance data T are collected from the 11 filters. When testing the efficacy of the wavelength estimator, a new "test transmittance data" set is collected separately from the training transmittance data. FIG. 6C shows the posterior probability as a function of wavelength. It is apparent that the maximum posterior probability is close to 1 around 700 nm and is almost 0 for the rest of the spectrum, which indicates the reliability of the Bayesian inference. The same procedure was performed to estimate all of the wavelengths (test and training).

Wavelength Estimation Accuracy

To discuss the efficacy of the wavelength estimator, the following estimation is defined:

$$(\%) = \frac{|\lambda_{Real}(\text{nm}) - \lambda_{Estimated}(\text{nm})|}{\lambda_{Real}(\text{nm})} \times 100 \quad (5)$$

Figure 6D:
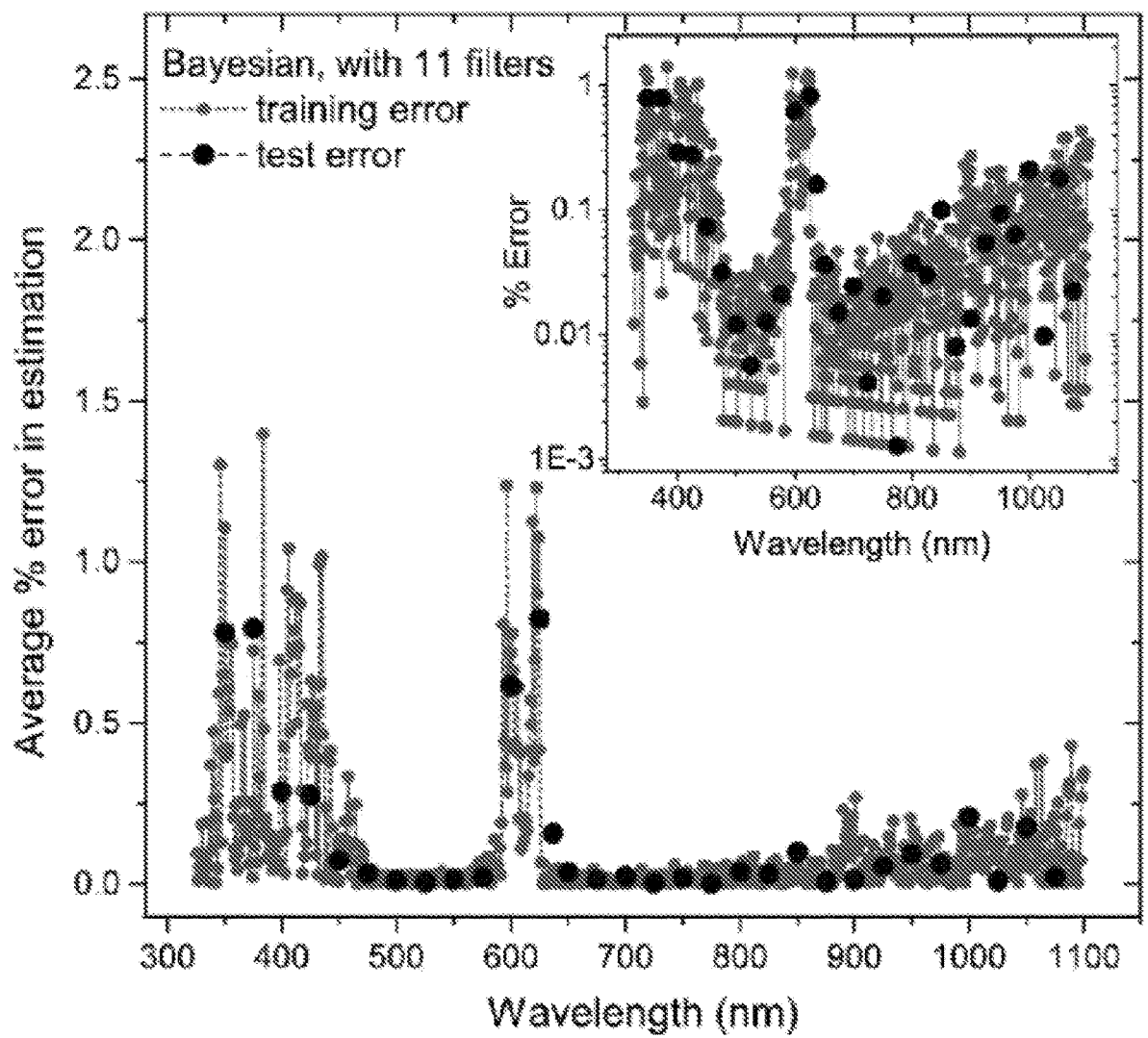
FIG. 6D shows average training (line plot) and test (black dots) wavelength estimation error percent of a Bayesian inference using all the 11 filters; the inset is a semilog plot of the same figure; each data point is averaged over 100 estimated values.

The average estimation error percentage (when using all 11 filters) is plotted as a function of wavelength in FIG. 6D. In FIG. 6D, the estimation error from both the "training" (line plot) and the "test" (black dots) data is plotted. It is shown in FIG. 6D that using only 11 filters and two photodiodes, the cyber-physical color estimator can achieve a high accuracy color estimation, with just a very few estimation data points lying above 1% error, with most of the error values being far lower in comparison. To appreciate how high the accuracy values reached, a semilog plot of the same data has been shown in the inset of FIG. 6D. It is shown that not only a significant portion of the estimated wavelengths from the training data set was better than 0.1%; the lowest errors are arriving close to 0.001%, or a few ten parts per million (ppm). In particular, the test data, which could be performed only on a smaller set of source wavelengths, appear to fall well within these low-error accuracies. This fact that errors for the estimation of the test samples are well within the range of training errors highlights a very important feature of the cyber-physical wavelength estimator; i.e., the efficacy of the Bayesian inference approach is generalizable from training set to test data. In other words, a lab-trained system is very likely to continue providing high-confidence wavelength estimations under field testing as well. It is shown that the cyber-physical approach using 11 filters and the Bayesian inference system is not only able to estimate unknown wavelengths with a high degree of accuracy but also do so with equal efficacy under both training and testing conditions.

To compare the estimation results of the Bayesian inference with another data-driven approach, the k-nearest neighbor model is chosen as one of the most straightforward machine learning algorithms, which is widely used in supervised classification applications. For training and testing the k-nearest neighbor, the same training and testing data sets can be used as are used in the Bayesian inference, respectively. While in some instances the k-nearest neighbor approach provides estimations of nearly the same accuracy as the Bayesian approach, overall the estimation accuracy with the Bayesian methods can be superior over the entire spectral range, especially at the lower wavelength values where the deviation of estimation from the real values is larger. A comparison of machine learning approaches is presented in Example 3.

When machine learning is used as a discriminative model in order to distinguish different categories (e.g. different optical wavelengths), it comes in one of these two forms: "supervised learning", where new samples are classified into N categories through training based on the existing sample-label pairs; and "unsupervised learning", where the labels are not available, and the algorithm tries to cluster samples of similar kind into their respective categories. In this application, labels are wavelengths that combined with measured transmittance values, that will be called filter readings, create the set of sample-label pairs known as the training set. Therefore, the analytical approaches are chosen based on the supervised machine learning algorithms. Apart from the Bayesian inference, k-nearest neighbor, artificial neural networks, and support vector machines are tested.

As for the Bayesian inference, for a given set of known sample-label pairs (i.e. training set), Bayesian inference gathers statistics of the data and uses them later to classify an unknown new sample by maximizing the collective probability of the new sample belonging to corresponding category (illustrated in FIG. 11A). In pattern recognition, the k-nearest neighbor model is a non-parametric supervised learning algorithm used for classification and regression, which searches through all known cases and classifies unknown new cases based on a similarity measure defined as a norm-based distance function (e.g. Euclidean distance or norm 2 distance). Basically, a new sample is classified into a specific category when in average that category's members have smallest distance from the unknown sample (illustrated in FIG. 11B). Here, k is the number of closest cases to the unknown sample, and extra computation is needed to determine the best k value. This method can be very time-consuming if the data size (i.e. total number of known sample-label pairs) is large.

Artificial neural networks are computing models that are inspired by, but not necessarily identical to, the biological neural networks. Such models "learn" to perform tasks by considering samples, generally without being programmed with any task-specific rules. An artificial neural network is based on a collection of connected units or nodes called artificial neurons, that upon receiving a signal can process it and then pass the processed signal to the additional artificial neurons connected to them. A neural network has always an input layer that are the features of each training sample and an output layer that are the classes in classification problem, while it can also be only a number in regression problem. However, there are often more than just two layers in an artificial neural network model. The extra layers that are always located between the input and output layers are called hidden layers. The number of hidden layers, the number of neurons in each layer, and how these layers are connected form the neural network architecture. In general, having more number of hidden layers increases the capacity of the network to learn more details from the available dataset, but having much more layers than necessary can result in overfitting the model to the training set i.e. the model might be performing well on the training set but poorly on the unseen test set. In this work two different fully-connected ANN architectures are used to investigate their efficacy on optical wavelength estimation. The schematics of a three layered fully-connected artificial neural network model is shown in FIG. 11C. Backpropagation is the central mechanism by which a neural network learns. An artificial neural network propagates the signal of the input data forward through its parameters called weights towards the moment of decision, and then back-propagates the information about error, in reverse through the network, so that it can alter the parameters. In order to train an artificial neural network and find its parameters using the training set, labels are given to the output layer herein, and then back-propagation is used to correct any mistakes which have been made until the training error becomes in an acceptable range.

When it comes to supervised classification, support vector machine algorithms are among the powerful machine learning inference models. In its primary format as a non-probabilistic binary linear classifier, given labeled training data, support vector machine outputs an optimal hyperplane which categorizes new examples into two classes. This hyperplane is learned based on the "maximum margin" concept in which it divides the (training) examples of separate categories by a clear gap that is as wide as possible. When there are more than two classes, support vector machine can be used as a combination of several one versus rest classifiers to find hyperplanes that discriminate one category from the rest of them. Support vector machine can also efficiently perform non-linear classification using what is called the kernel method by implicitly mapping the samples original features set into a higher dimensional feature space, as illustrated in FIG. 11D, and a new sample is classified depending on the side of the margin that it falls in. Apart from linear support vector machine, five choices of kernels are examined when using support vector machine classifiers during the investigations herein.

It is next shown, in a stepwise manner, how the wavelength estimation efficacy changes as the number of filters is reduced.

Filter Selection and Its Effect on Estimation Accuracy

A key advantage of the cyber-physical system technology is that its ultimate estimation accuracy depends on both the efficacy of the Bayesian inference approach (or the machine learning selected) and the total number of filters used. In other words, if such high accuracy is not required for any specific application, it is possible to further reduce the physical complexity of the system. With all the training data available herein, it is possible to investigate the estimation accuracy of the system by identifying and removing the filters that are least effective, in a step-by-step manner. Understandably, if one uses a fewer number of filters for estimation, the error tends to increase. The estimation error versus wavelength plot when using only 1, 2, or all 11 filters is shown in FIG. 7A. When only one filter, $f_1$, is used, the error is largest as would be expected. It is found out that using only two or one filter(s), the highest estimation error grows by a factor of ~5 and ~25, respectively, at the most error-prone region between 325 and 500 nm (see larger error 325-500 nm, FIG. 7A). In most of the remaining parts of the spectrum, the estimation error remains much lower, as seen more clearly in the inset of FIG. 7A that shows a semilog plot of the test and training error when using filters $f_1$ and $f_{11}$. To clearly demonstrate, starting with all 11 filter functions, using the Greedy algorithm as a filter selection approach, the number of filters can be sequentially reduced by discarding the filters with least contribution toward accuracy of estimation one by one. This way, the complexity of the system can be reduced systematically while minimizing the cost of reducing overall accuracy at each step. FIG. 7B presents the results of this Greedy algorithm filter selection. In FIG. 7B, on the left side of the representation, each cell represents a filter function being used (gray box) or discarded (white space). Starting from the top, where all the 11 filters are present, the Greedy algorithm was used to drop the least useful filter, and this is represented in the next row down. In this way, in each row, the least useful filter is dropped, and the mean value of the average error (from the entire spectrum) is plotted as a horizontal bar graph on the right end of the row (right, FIG. 7B), for both training and test errors.

At the right of FIG. 7B, the mean average error (presented in nanometers instead of percentage values) does not change much until it gets to the last few filters, suggesting that the filter-to-filter variation of transmittance functions by using the simple approach is quite effective. Indeed, even with two filters the error is significantly small, with an effective average error of ~6 nm, which reflects less than ~1% error at the center of the spectrum. Applying this feature selection method when only two filters are desired reveals that the filters $f_1$ and $f_{11}$ would give the best wavelength estimation results in this example, which is expected because these two were the most independent filters being fabricated by using completely independent nanomaterials, while the other filters are mixtures of both materials. The increase in error is more obvious when switching from 2 to 1 filter, which establishes that a single-filter photodetector would not be enough for reliable wavelength estimation.

Sources of Estimation Error

Figure 8A:
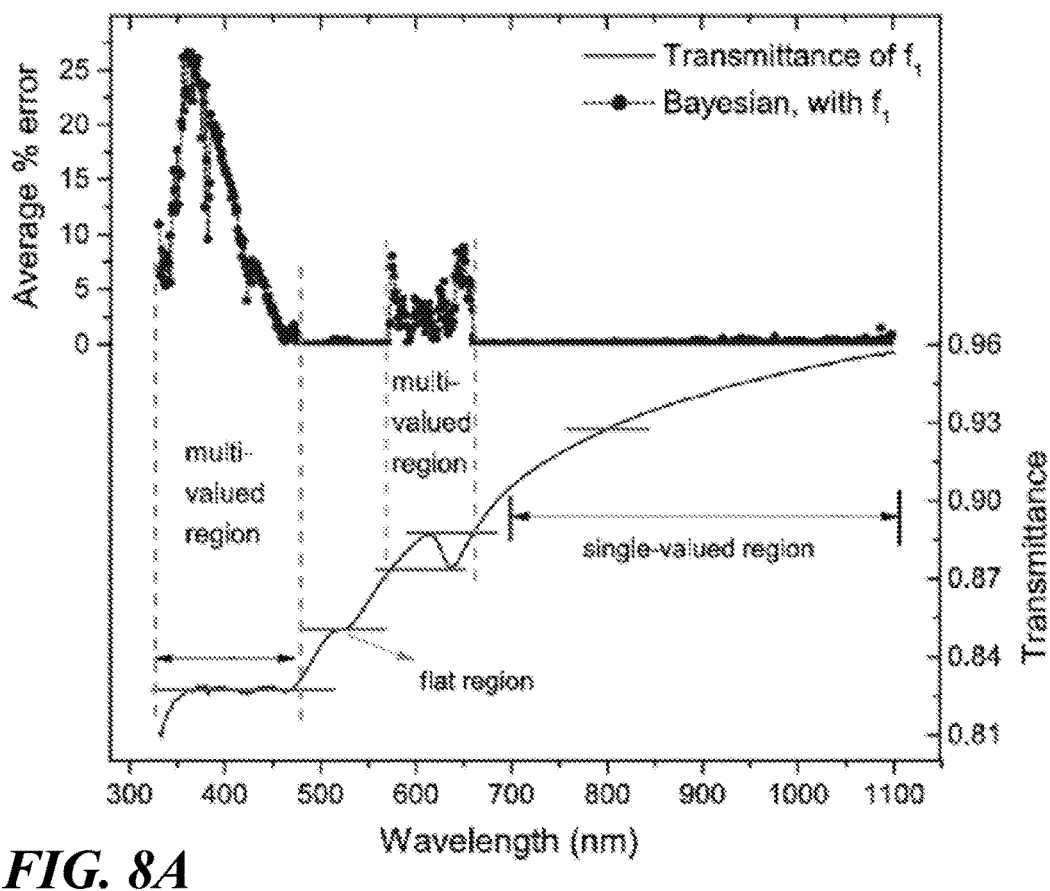
FIG. 8A shows average training error percent of a Bayesian estimation when using only filter $f_1$ (error percent is top curve) and transmittance spectrum of the same filter (transmittance spectrum is bottom curve). Vertical dashed lines indicate that coexisting different wavelengths with same transmittance values in the same neighborhood leads to inaccuracy in estimating wavelength, but when the transmittance is single-valued, the error is small.
Figure 8B:
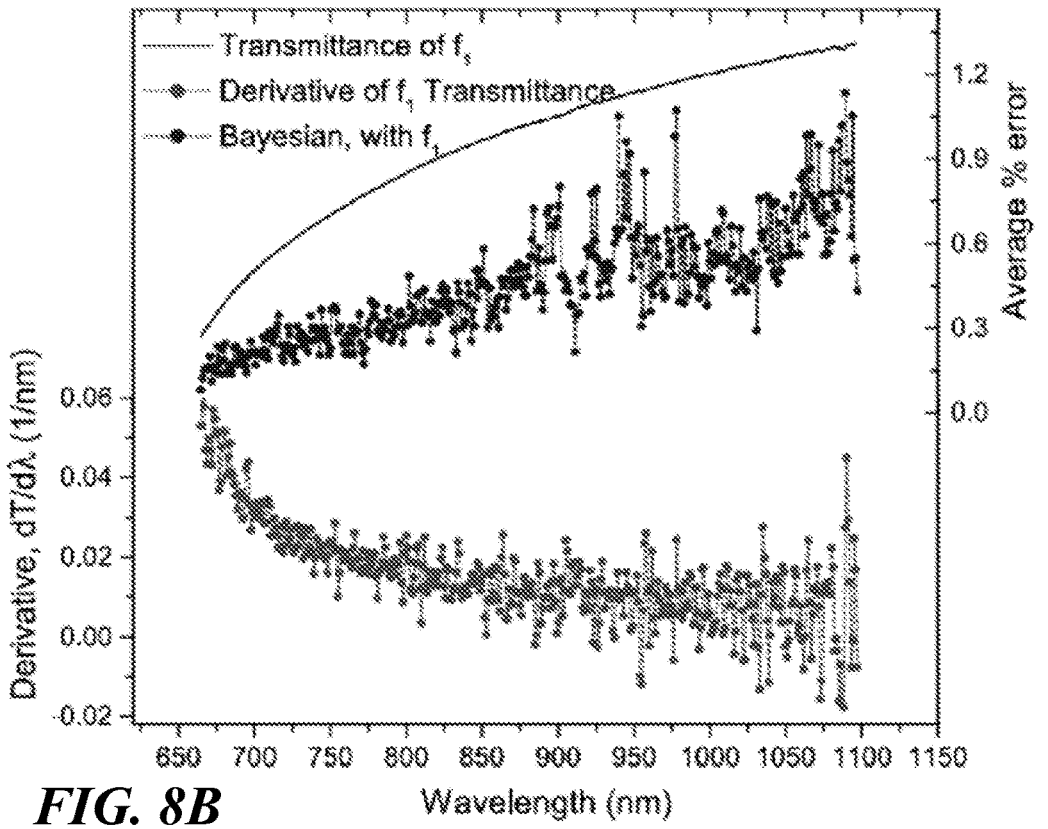
FIG. 8B shows a selected wavelength range of FIG. 8A (showing 665-1100 nm) that has monotonic (increasing only) transmittance (transmittance shown as top black curve); also plotted is the first derivative (slope) of the transmittance versus wavelength (center curve) and the estimation error percent (bottom curve).

Factors that affect the accuracy of estimation as related to the curve shapes of the transmission functions are now discussed. There is an interesting correlation between the positions (wavelength values) of local maxima/minima of transmittance curves (which arise from variations of the density of states and presence of excitonic peaks), fairly well-known features of the spectral absorption curves of transition metal dichalcogenides, as seen in FIG. 5A, and where the errors tend to increase. Large error occurs across multivalued regions of the transmittance curve, i.e., regions where multiple wavelengths may have the same or very similar transmittance values. The estimation using only one filter is shown in FIG. 8A for simplicity. The horizontal lines between two vertical dashed lines clearly show when the horizontal lines cut more than once through the transmittance curve, the error becomes larger; but when a horizontal line passes through only one point, the error is smaller. This result is expected because multiple wavelengths will present similar posterior values in predictions, which are hence prone to wrong estimations. Thus, materials with monotonic responses (e.g., without excitonic or other absorption peaks, or in other words with single-valued spectral transmittances) are better choices for fabricating such filters. When applying the technology to other regions of the electromagnetic spectrum, the same concepts can be utilized. Using a first and second material selected for a region of the electromagnetic spectrum, a monotonic transmittance may be expected to produce more accurate results. Furthermore in FIG. 8A, even in the parts of the spectrum that filter function is monotonic (in this case only increasing) the errors are smaller when the slope (derivative) of the transmittance curve is larger. FIG. 8B, which refers only to a part of the spectrum between 665 and 1100 nm, reveals that as the slope (derivative) of transmittance decreases, the error increases.

For better capturing the deviations in estimation visualizing the errors, the root-mean-square (rms) percent error is used here; N=100 is the number of estimations per wavelength:

$$RMSE\ \% = \frac{\sqrt{\frac{\sum_{i=1}^{N}|\lambda_{Real}(nm) - \lambda_{Estimated}(nm)|}{N}}}{\sqrt{\frac{\sum_{i=1}^{N}|\lambda_{Real}(nm)|}{N}}} \times 100 \qquad (6)$$

From these results, it is concluded that ideal transmittance curves should be monotonic with adequately changing transmittance values. It is noted that while conceptually this is not difficult to understand, in a real-world situation, it is challenging to "pre-order" the transmittance curves of any material, pointing toward the usefulness of the characteristic transmittance of the transition metal dichalcogenides used in this example.

Wavelength Estimation for Light Sources with Different FWHM and Intensity

So far, results are obtained by using light beams with full width at half-maximum (FWHM) $\Delta\lambda=1$ nm for training data collection and testing the model in the 325-1100 nm spectral range. One important consideration is how far the inferences deviate under different source types. To test this, wavelength of different light sources with different FWHM and intensity are estimated. Two different scenarios are followed: first, the same instrument is used but two different FWHM ($\Delta\lambda=0.5$ and 4 nm) which had different intensities; second, two laser diodes with much wider FWHM ($\Delta\lambda=10\text{-}20$ nm) and even higher intensity are used. The relative error in estimating wavelength of these new sources with respect to the error of estimating the wavelength of the light beams with $\Delta\lambda=1$ nm (the main FWHM presented) at the same center wavelengths is presented in FIG. 9, which is defined as relative error=error ($\Delta\lambda$)/error($\Delta\lambda=1$ nm). Here, it is shown that estimation error remains acceptably low up to FWHM values of 4 nm, beyond which it starts to deviate, suggesting that the current approach is fault-tolerant even for somewhat non-monochromatic sources, increasing the acceptability of the approach in a real-world device. Hence, the model works well enough for different light sources after being trained by using one type of light source.

Filter Stability and Reusability over Time

Figure 10:
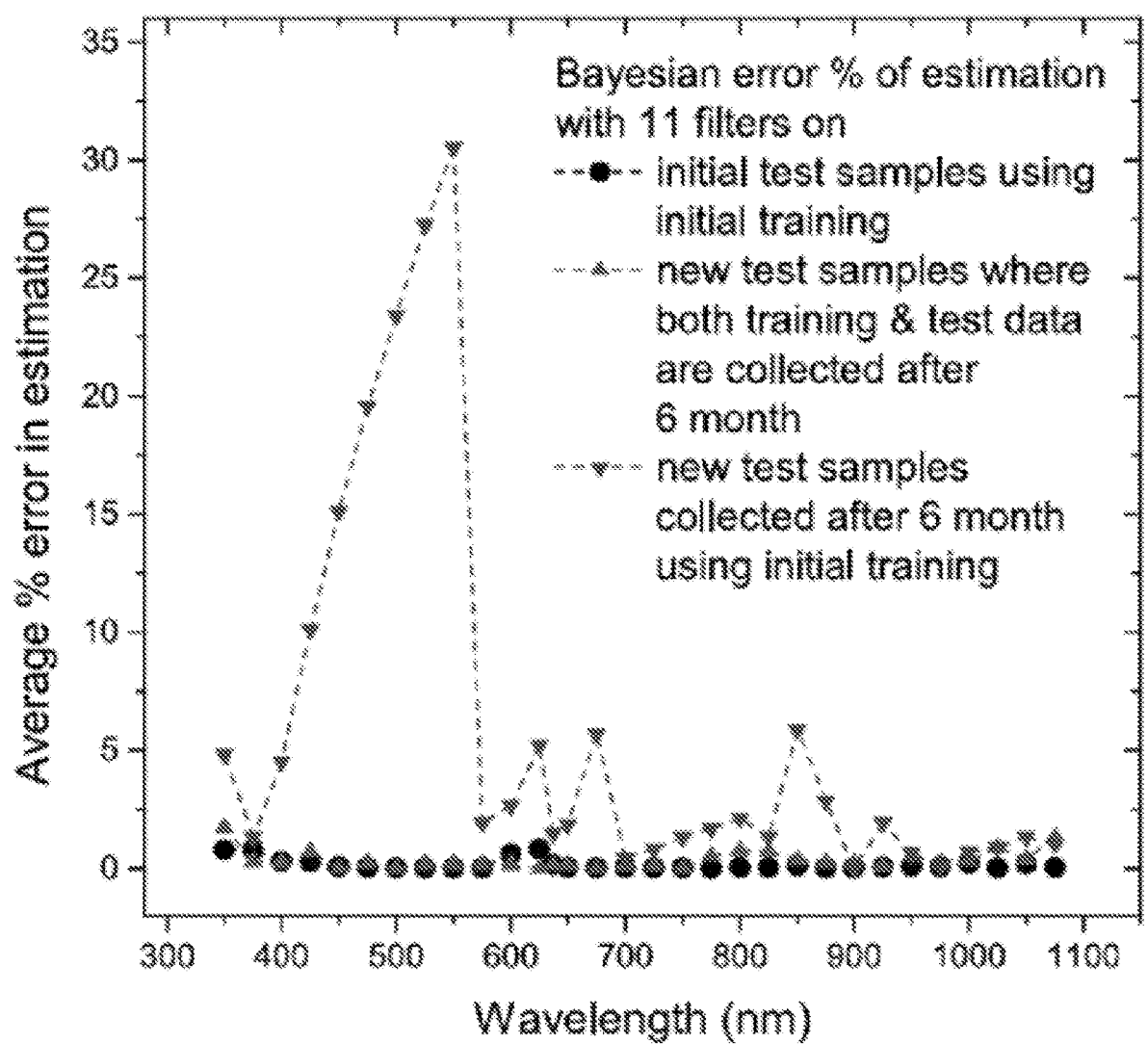
FIG. 10 shows average test error percent of a Bayesian estimation using the calibration with initial training set on test samples collected at the same time (black dots); average error on test samples collected after 6 months; and average error with new calibration (6 months after the first calibration) using new training and test samples (all collected 6 months after first calibration).

The estimation reproducibility of the easy-to-fabricate physical filters is an important consideration from a practical viewpoint. As discussed above, the filters are simply drop-casted onto the surface of regular glass slides without any additional protection, and the typical time lapse between first calibration of filters and the wavelength estimation was 1-100 days, which demonstrates the physical stability of the filters despite being left in ambient conditions for 10% of the time and under nominal vacuum storage for 90% of the time. Still, a gradual change of the optical properties in these nanomaterials is expected, as they absorb various gaseous species from the ambient environment. To check the stability of the filters, 6 months after the first calibration, a new test set is collected and was estimated by using the original 6 month old training data as shown in FIG. 10. It is interesting to see that while the estimation errors are found to have become larger for smaller wavelengths values, for most of the higher wavelength portion of the spectrum the estimation error remains better than 3% as seen in FIG. 10.

In FIG. 10, to see whether the filters are reusable in longer time spans or not, a new training set also is collected along with the new test set (6 months after original calibration). Despite some minor changes observable in transmittance (optical response or filter function) of the filters, by calibration of the filters using the new set of training data, it is possible to estimate the new unknown wavelength as accurately as before (FIG. 10). This not only suggests fair stability of these nanomaterial filters but also shows that by calibrating the filters from time to time, it would be possible to continue using these same filters over extended periods of time, and the efficacy of estimations does not suffer from wear or minor scratches, since the calibration will overcome the gradual changes of the filters.

A new approach is shown that applies data analytics (i.e., Bayes's theorem) to the optical transmittance information collected from two low-cost nanomaterial filters to estimate the wavelength of a narrow-band unknown incident light with high accuracy. Once trained, the wavelength estimator does not require spectrum-splitting techniques such as prisms or diffraction gratings; only two single-cell photodetectors and between 2 and 11 filters (FIG. 2A, FIG. 5C) are sufficient to do the estimation. Using more numbers of filters that are created from the same two nanomaterials, it is possible to considerably improve the accuracy of estimation, and with a feature selection algorithm (FIG. 7B) the minimum number of filters needed for an acceptable value of average accuracy can be determined by retaining the only the "most relevant" filters. Even though the experiment is performed over the range 325-1100 nm, this approach can be extended beyond in both the UV and NIR directions, thereby providing next-generation wavelength estimators for both visible and beyond-visible regions of the electromagnetic spectrum. It is also shown, though the training is done with the beam lights of FWHM=1 nm, but the model can estimate center wavelength of the light sources with different FWHM and intensity; as the incoming light deviates from being monochromatic, the estimation error tends to increase as expected, which defines the limits by which a beam of light can be termed "monochromatic" in monochromatic wavelength estimation.

The filters perform robustly even after many months without additional protection and only low-maintenance storage, and by recalibration of the Bayesian inference model used for estimation from time to time, it is possible to continue using these same filters with high accuracy over extended periods of time (FIG. 10). In the ranges of the spectrum that filter function (transmittance) has a monotonic dependence on wavelength, the estimation accuracy is higher, and furthermore, there is a positive correspondence between slope of filter function and accuracy of estimation (e.g., FIG. 8A). Hence, based on the application and desired spectral range, the highest accuracy values will be obtained by using materials throughout the electromagnetic spectrum (e.g., either TMDs or other transparent films) whose transmittance values show large but monotonic changes with wavelength. In addition to the Bayesian approach, the k-nearest neighbor model analysis was also successfully applied. The technology opens up a completely new path for designing next-generation sensors and detectors that can harness the power of data analytics to reduce the physical complexity of detectors in general and in particular for future works on generic nonmonochromatic lights using more advanced data analyzing methods and state-of-the-art machine learning techniques. This significantly transforms the field of high-accuracy sensing and detection using simple cyber-physical approaches.

Advantages of the present technology include reduced complexity, size, weight, power and maintenance requirements, which can eliminate the need for sophisticated characterization tools where only detection or comparison of color is required. The technology can perform data collection and immediate characterization and color perception without the need for separate equipment to perform these individual tasks, or without the need for a human experimenter or operator who perceives the color based on the analyzed data. The reduced size of the device makes it possible to be used in applications where the target size is on the order of micrometer or less, while other color characterization devices can be larger by several orders of magnitude.

The range of electromagnetic waves covered over the wavelength band depends on the materials used for the two or more materials. The technology can provide detectors to respond to electromagnetic wavelengths beyond visible light and can be used in various analytical identifying instruments, space and planetary research, and satellites for imaging of earth using multiple parts of the spectrum. The technology can utilize two or more materials to provide a device for identifying a wavelength of electromagnetic radiation within a wavelength band for a replacement for expensive spectroscopic tools in analytical instruments used for identification of different chemical and biological dyes. The technology can also provide spectral imaging using any part of the spectrum, not just color imaging. The applications for optoelectronics are large and require a new perspective on the available potentials for spectral research.

Figure 15:
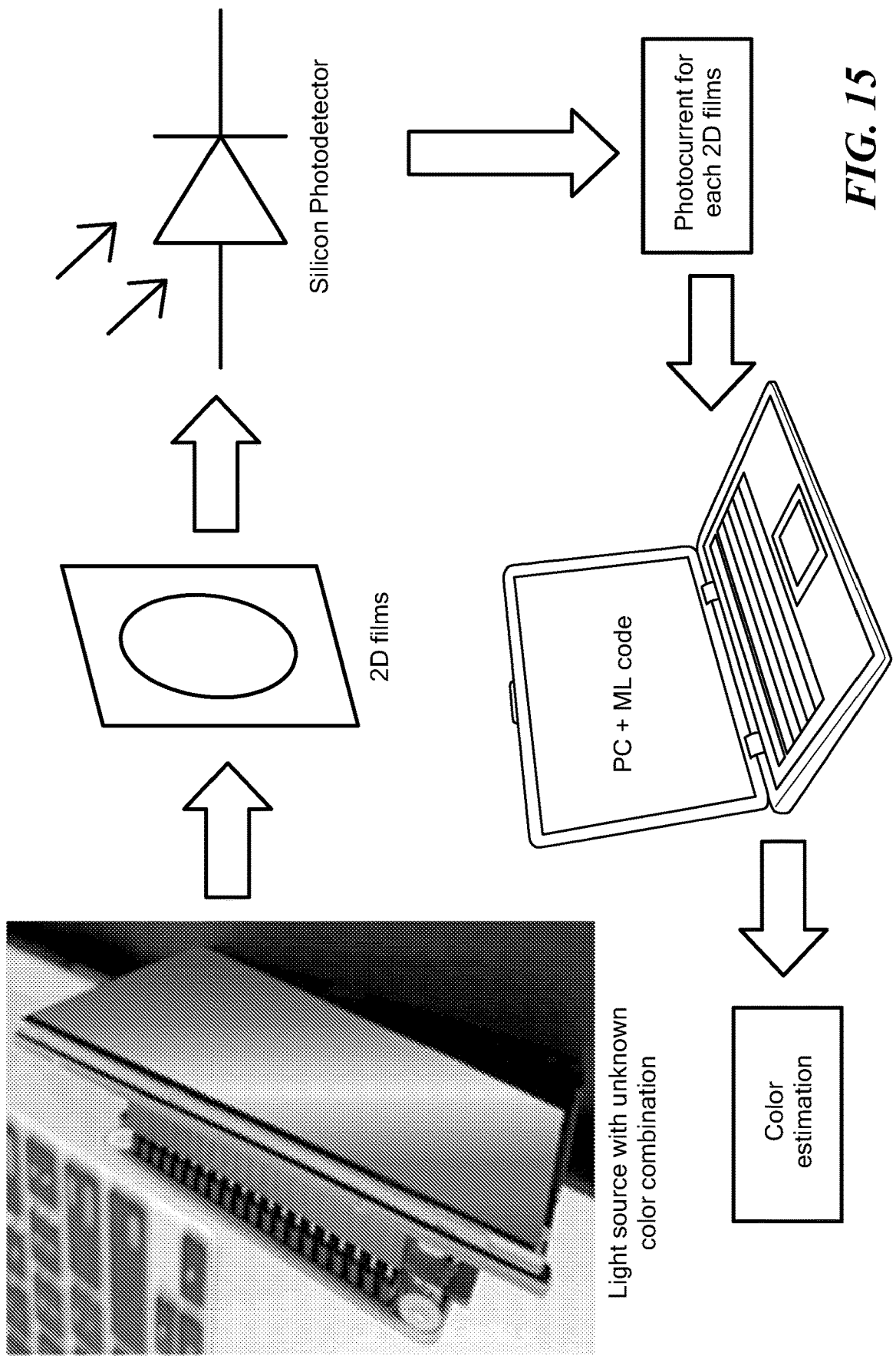
FIG. 15 shows an example schematic of determining a color of an external light source utilizing the technology herein.

For example, the present technology provides a device that can perform color perception. The device can collect optical transmittance and/or optoelectronic photocurrent of a light source by allowing the light to pass through two or more nanomaterial filters and then shine on one or more photodetectors. The device then uses a machine learning code to analyze the collected data and determine the color combination of the light source. FIG. 15 shows a schematic illustration of a process of color estimation using a device described herein. In FIG. 15, multicolor light can be presented from a variety of available light sources. For testing purposes, a small LCD screen can be used to create a multicolor beam, and its colors can be changed using a computer. The light beam, after passing through an array of 2D material films, shines onto a silicon photodetector. Then the measured transmittance and/or photocurrent for each filter is analyzed using a machine learning ("AI") program to determine the color of the incoming light.

Figure 16:
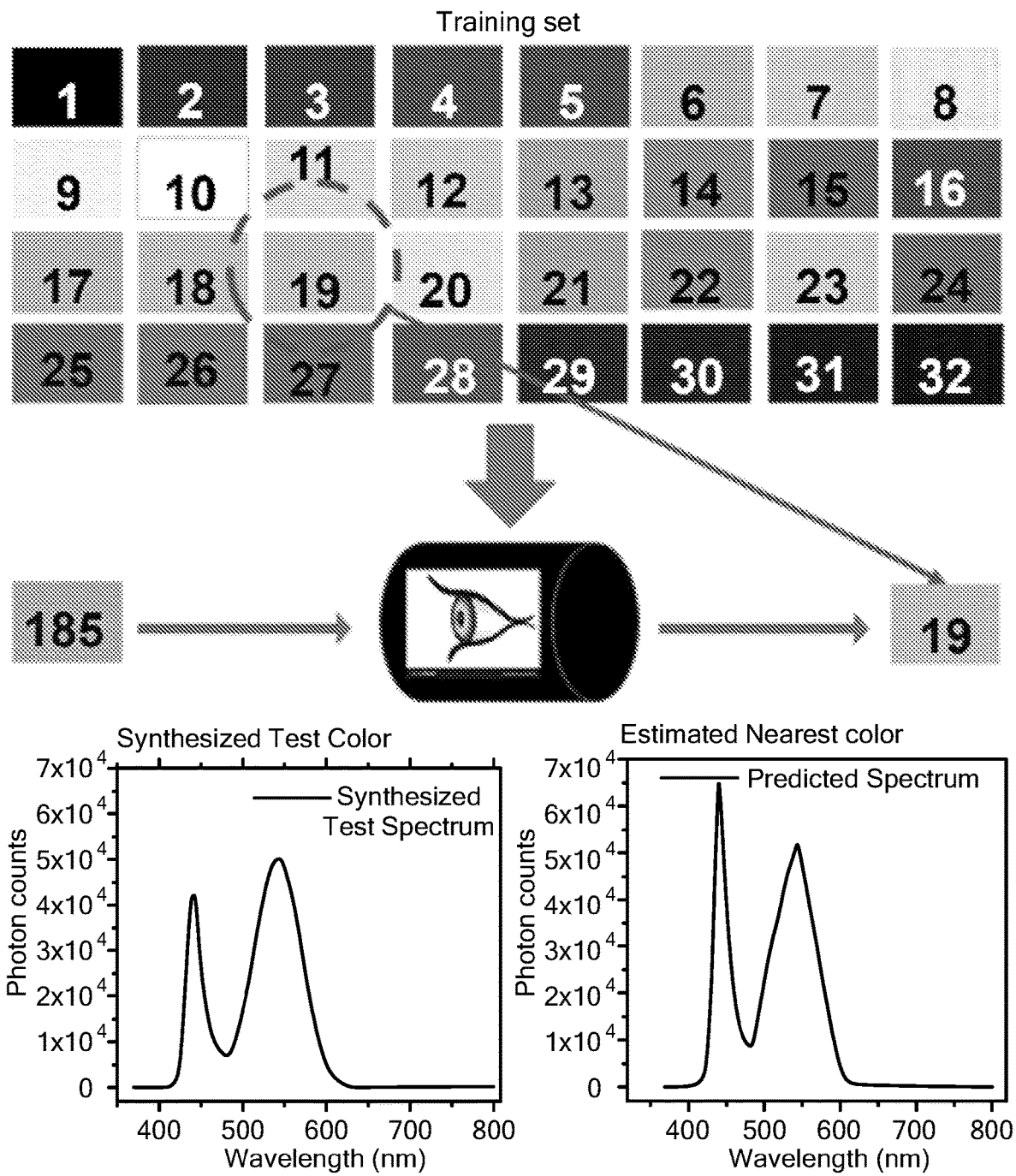
FIG. 16 shows the variety of colors (each color represented by a number) used for training an artificial intelligence module of the technology; the spectrum of a synthesized test color 185 is shown at lower left; the predicted spectrum of the estimated nearest color 19 is shown at lower right.

For example, the technology herein can provide low cost sensors able to distinguish red, green, and yellow to recognize traffic signals in self-driving vehicles, or for guiding drones in industrial applications. In another example, a pixelated version could provide color vision in robots, bionic systems, or a potential for medically restoring or improving color vision. The underlying technology combines two components, a range of physical transmittive films made of nanomaterials placed in front of a photodetector that generates spectrally-varying responses in each detector, and a set of computer algorithms that utilizes these variations to discern spectral information and color in the visible range. The range of electromagnetic waves covered depends on the materials used. For example, nanomaterial transition metal dichalcogenides and many other materials which have band gaps in the visible region of the EM spectrum are useful for color estimation/spectral estimation in the UV-vis-NIR region of the electromagnetic spectrum. FIG. 16 shows a schematic representation of a process for training an artificial intelligence, such as a neural network, with the set of actual colors shown ranging from black to white. After the device has been trained a new color 185, not part of the training set, can be used to test color recognition. In FIG. 16, the actual training set of colors are shown on top including black 1, brown red 2, visible infrared 3, deep red, red 5, orange 6, yellow orange 7, yellow 8, ultra yellow 9, white 10, light yellow green 11, yellow green 12, bright green 13, green 14, lime green 15, brown green 16, light green blue 17, aqua green 18, blue green 19, aqua blue 20, sky blue 21, bright blue 22, blue violet 23, red pink 24, red purple 25, bright purple 26, purple 27, blue purple 28, blue 29, deep blue 30, brown blue 31, dark blue 32. All of the colors combinations of red, green, and blue with different intensities. A test light labeled 185 in FIG. 16 (visually a greener blue green), which is not part of the training set, is examined by the artificial intelligence. The artificial intelligence is able to distinguish the nearest neighbor from the training set to the test light 185. The actual spectrum of the test and predicted lights are actual spectra measured with a commercially available spectrometer and presented for comparison at the bottom of FIG. 16. As can be seen, these two multicolor lights 185 and 19 have a close spectral distribution. Any source of colored light can be used for training, and the spectral range can be in the visible or extended to non-visible wavelengths. As shown in the bottom right predicted spectrum, the predicted color is the closest spectrum among the training set to the test color.

Other example uses of the present technology include for CMOS and CCD cameras, spectrometers and spectrophotometers, image recognition software, self-driving vehicles, robots, drones, bionic vision, biosensors, nanosensors, photodetectiors, food safety monitors, optical sensors, Raman spectroscopy, material characterization, imaging, image recognition, and DNA sequencers.

The present technology can be used in the visible region as well as in the non-visible region of electromagnetic spectrum. In one example, a spectral range of 200 nm-1100 nm provides a UV-Vis-NIR instrument which covers the near-infrared, visible, near-ultraviolet and middle-ultraviolet light. The nanomaterial transition metal dichalcogenides, for example, molybdenum disulfide, tungsten disulfide, bismuth selenide, indium gallium arsenide, molybdenum diselenide, tungsten diselenide, and molybdenum ditelluride, in this example have band-gaps that fall in the visible region, but these nanomaterials can be replaced with other nanomaterials, such as black phosphorus, that have smaller band-gaps and can cover the entire infrared region of the electromagnetic spectrum, while the machine-learning techniques and the overall concepts behind the technology remain the same.

The technology can provide high resolution wavelength detection (e.g., <1 nm resolution) without requiring a grating, prism, interferometer, etalon, or filter with the detection device. Energy losses associated with optics can be avoided. For example, most spectrometers use reflection and grating techniques, which lead to losses.

If machine learning training of the filters is provided on a hyperfine resolution spectrometer, the filters can then be moved into the experimental field to provide hyperfine resolution wavelength detection (e.g., <1 nm resolution) utilizing a suitable light source, detector, and the stored training with software. The costly hyperfine resolution spectrometer (which was used for the training) need not be moved out of the lab. It is envisioned that the filters could be provided pre-trained with software including machine learning (training) to provide wavelength detection in specific ranges of the electromagnetic spectrum.

The present technology can apply new materials in regions of the electromagnetic spectrum for wavelength detection, instead of for use as background. For example, barium fluoride ($BaF_2$) and calcium fluoride ($CaF_2$) are commonly used in infrared spectrometry for transparency. However, millimeter thick barium fluoride (UV grade) and millimeter thick calcium fluoride (UV grade) both have good transmittance in the UV region from about 140-250 nm. Both also provide monotonic changes in transmittance over this UV region. The monotonic changes are typically viewed as background noise. A variety of new materials can be applied in regions of the electromagnetic spectrum for wavelength detection, where those same materials were previously used in those same regions as, for example, substrates or sample holders. In the examples shown herein, nanoscale thicknesses are shown, but larger thicknesses of materials can be used for the technology depending, for example, on the wavelength region of the electromagnetic spectrum, the penetration of the electromagnetic radiation through the filter (transmittance) and the materials chosen (e.g., barium fluoride and calcium fluoride). For example, the thickness of the materials can be greater than a micron, greater than a millimeter, or greater than a centimeter. The thickness of the materials, for example, can be changed to change the signal to noise, depending on the transmission of the materials and the sensitivity of the one or more detectors.

To provide the technology in a desired region of the electromagnetic spectrum, two materials can be identified that provide transmittance in that region of the electromagnetic spectrum. In general, once a region of the electromagnetic spectrum is of interest, materials that are known to provide transmittance in that region with some absorbance should be identified. For example, if a wavelength detector in the region from about 1200 nm to about 1600 nm is desired, materials that transmit but have some (e.g., monotonic) absorbance in the region from about 1200 nm to about 1600 nm can be located.

The methods described herein can be implemented in any suitable computing system. The computing system can be implemented as or can include a computer device that includes a combination of hardware, software, and firmware that allows the computing device to run an applications layer or otherwise perform various processing tasks. Computing devices can include without limitation personal computers, work stations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by a system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network. The computer system can include architecture distributed over one or more networks, such as, for example, a cloud computing architecture. Cloud computing includes without limitation distributed network architectures for providing, for example, software as a service (SaaS).

EXAMPLES

Example 1: Production of Drop-Cast Filters

To obtain filters, sonication-assisted liquid-phase exfoliation was utilized as a step to produce the drop-cast filters. Bulk $MoS_2$ and powder of $WS_2$ were purchased from ACS material. Bulk $MoS_2$ was ground by using a pestle and mortar, but the powder of $WS_2$ was used as received (a) (FIG. 1). 80 mg of $MoS_2$ powder and 8 mL of isopropyl alcohol (IPA) were added into a beaker and stirred until the dispersion became dark (b), FIG. 1; then the mixture was exfoliated in liquid phase via sonicating by using 30 kHz and 80% of the power of a UP100H Hielscher ultrasound processor for 8 hours while the beaker was placed in cool water to avoid overheating all the time as shown in (c), FIG. 1. Afterward, the dispersion was left still (d), FIG. 1, for a minute for the bulk materials to settle down; the supernatant (top half) of the dispersion was collected and centrifuged for 2 min with 1000 rpm using a Thermo Scientific centrifuge (e), FIG. 1. The supernatant (top one-third) of the centrifuged dispersion was moved to another container and was centrifuged again at 1000 rpm for 5 minutes. Finally the supernatant was collected and stored. The same method was used to produce more amounts of 2D nanomaterials of both $MoS_2$ and $WS_2$.

The schematics of exfoliation and drop-casting can be found in FIG. 1. Before drop-casting it was useful to know the relative concentrations of $MoS_2$ and $WS_2$. For this purpose, the absorbance of the two dispersions was measured for a few different wavelengths by using a PerkinElmer Lambda 35 UV-vis-NIR spectrometer. By adding some amounts of IPA into the denser dispersion, the relative concentration of the two dispersions was equalized; this would make the gradual mixing task much easier since the goal was to create a vector of different combinations of these two materials by gradually changing the relative proportions, being 100% $WS_2$ (for f1), gradually adding $MoS_2$ and reducing $WS_2$ in steps of 10% to create new combinations (for $f_2, \ldots, f_{10}$), and finally reaching to 100% $MoS_2$ (for $f_{11}$). Altogether 11 of such combinations were made, stored in separate sealed containers, and later drop-casted by using micropipet onto the surface of separate clean glass slides (FIG. 2A). The number of drops for each glass slide was kept the same to create almost the same thickness and area of drop-casted materials on glass. The IPA dried out in a few seconds. The slides with nanomaterials on them (called "filters") were annealed in nominal vacuum for 12 hours to stabilize them and eliminate any trace of IPA. Digital photographs were acquired (FIG. 2A) of the filters. Microscope images were acquired, for example, as shown in FIG. 2B, FIG. 2C, and FIG. 2D.

Example 2: Training of an Artificial Eye

FIG. 15 shows a general schematic of how determining color of an external light source was accomplished. A multicolor light can be presented from various types of light sources. For testing purposes, a small LCD screen can be used to create a multicolor beam and change its colors using a computer. The light beam, after passing through an array of the two-dimensional material films (filters), shines onto a silicon photodetector. Then the measured transmittance and/or photocurrent for each filter is analyzed using the machine learning program to determine the color of the incoming light.

FIG. 16 shows a schematic representation of a process of training the device with the depicted set of actual colors ranging from black to white, then using the trained device to estimate the color of incoming light which was not part of the training set. In FIG. 16, the actual colors used for training the device are shown on top. The training set of colors depicted in FIG. 16 depicts black 1, brown red 2, visible infrared 3, deep red, red 5, orange 6, yellow orange 7, yellow 8, ultra yellow 9, white 10, light yellow green 11, yellow green 12, bright green 13, green 14, lime green 15, brown green 16, light green blue 17, aqua green 18, blue green 19, aqua blue 20, sky blue 21, bright blue 22, blue violet 23, red pink 24, red purple 25, bright purple 26, purple 27, blue purple 28, blue 29, deep blue 30, brown blue 31, dark blue 32. All of the colors were combinations of red, green, and blue with different intensities. These colors were created with a small LCD screen. Then a test light labeled 185 in FIG. 16 (visually a greener blue green), which was not part of the training set, was examined by the device. The process was carried out, and the device was able to find the nearest neighbor from the training set to the test light 185. The actual spectrum of the test and predicted lights are actual spectra measured with a commercially available spectrometer and presented for comparison at the bottom of FIG. 16. As can be seen, these two multicolor lights 185 and 19 had a close spectral distribution. Any source of colored light can be used for training, and the spectral range can be in the visible or extended to non-visible wavelengths. As shown in the bottom right predicted spectrum, the predicted color is the closest spectrum among the training set to the test color.

Example 3: Accuracy Comparison for Machine Learning Algorithms

Figure 11A:
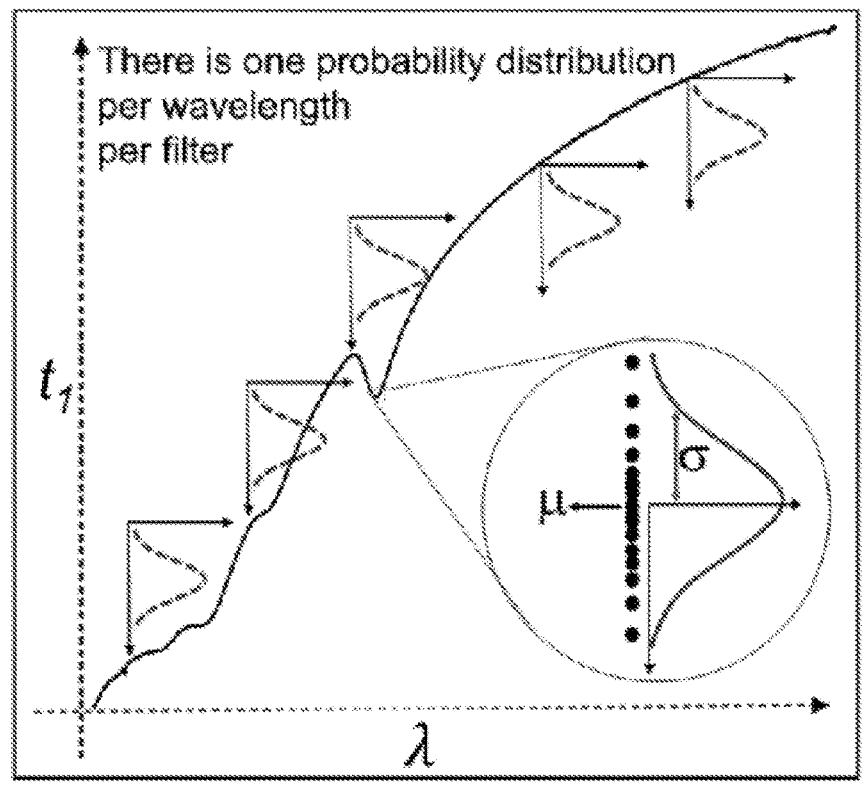
FIG. 11A shows a schematic of the Bayesian inference model illustrating at each wavelength over each filter a probability distribution can be formed from the labeled samples of that given wavelength.
Figure 11B:
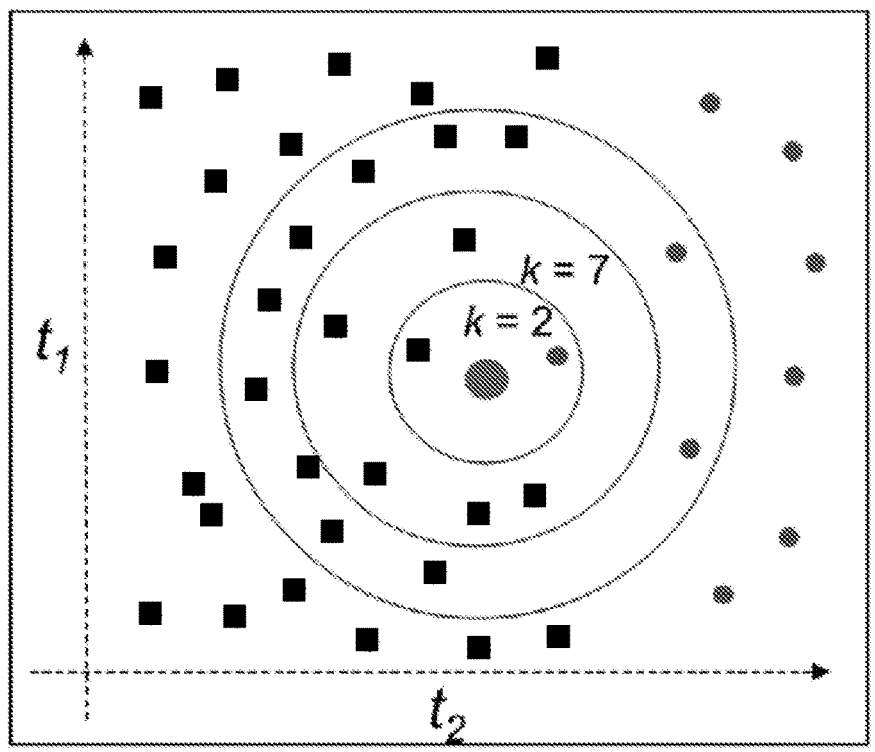
FIG. 11B shows a schematic of a k-nearest neighbor algorithm; the unknown sample represented at the center will be classified depending on the majority votes of the samples encircled in the circles depending on the number of the closest neighbors.
Figure 11C:
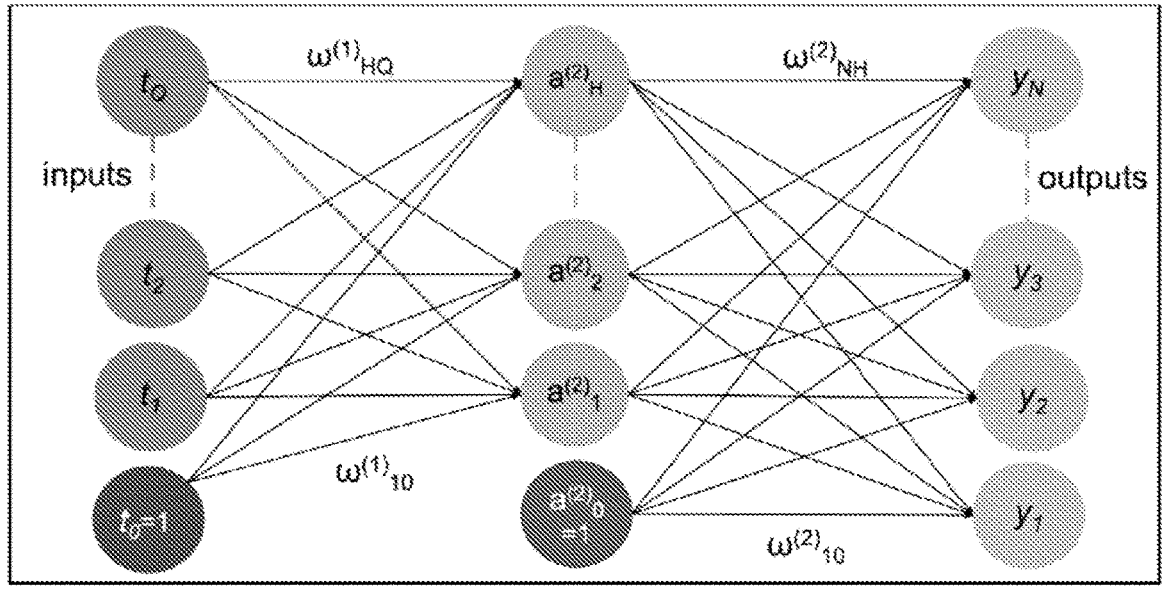
FIG. 11C shows a schematic of a fully-connected three layered artificial neural network model.
Figure 11D:
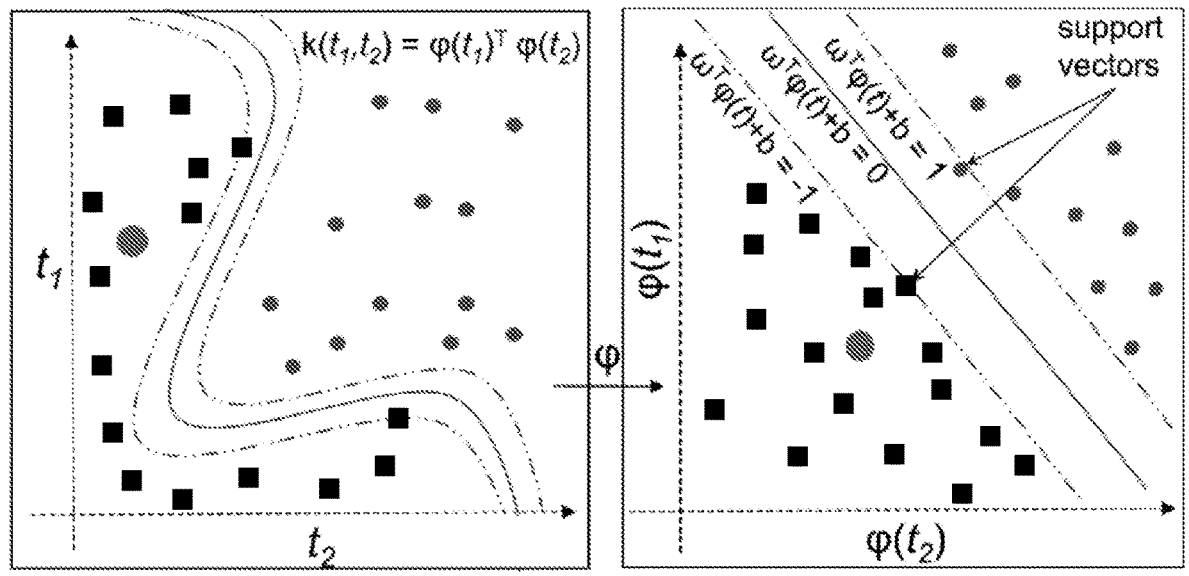
FIG. 11D shows a schematic of the non-linear support vector machine algorithm, where the wavelength classes are the same as in FIG. 11B, and the solid line draws the barrier between the two classes; the dashed lines indicate the margins.
Figure 12A:
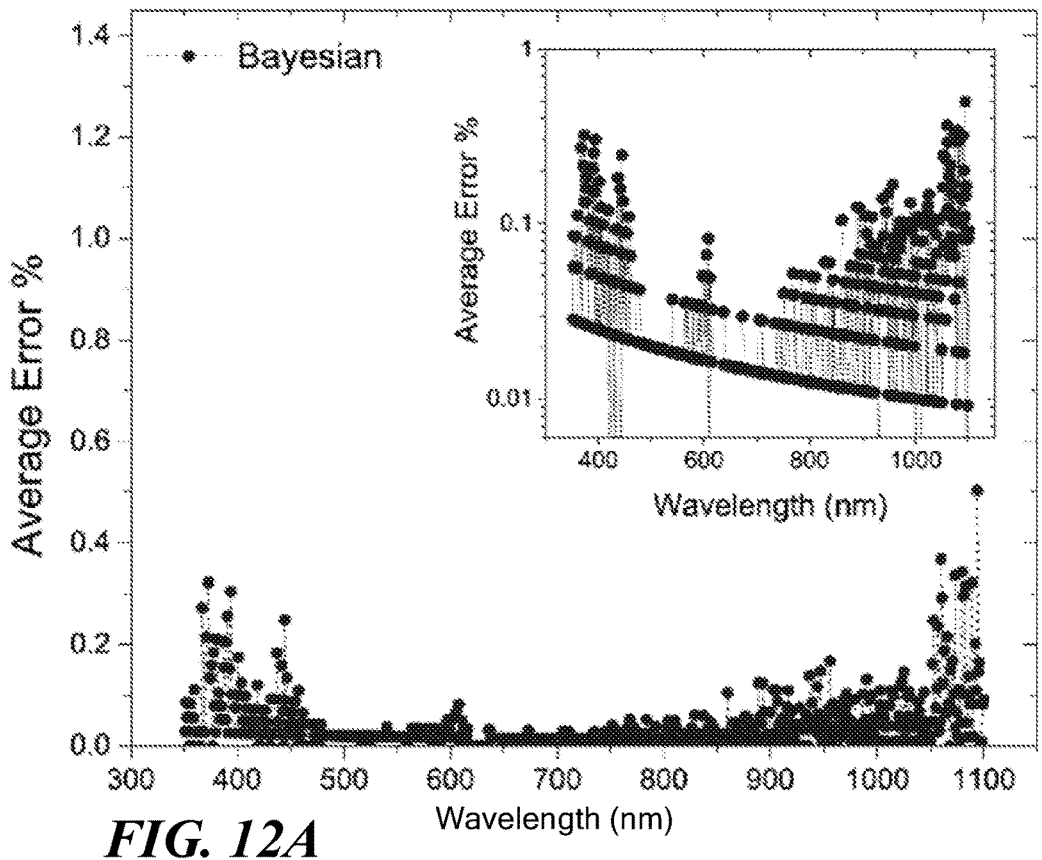
FIGS. 12A-12D show the percent error of estimating wavelength of test samples in a given wavelength averaged over 10 samples of the same wavelength using all 11 filters ($f_1$-$f_{11}$) for Bayesian inference (FIG. 12A), the k-nearest neighbor algorithm (FIG. 12B), the artificial neural network model (FIG. 12C), and linear support vector machine (FIG. 12D); the insets shows semi-log plots of the same; in the insets the values that are close to zero have been cut off the y-axis of each plot for better visibility.
Figure 12B:
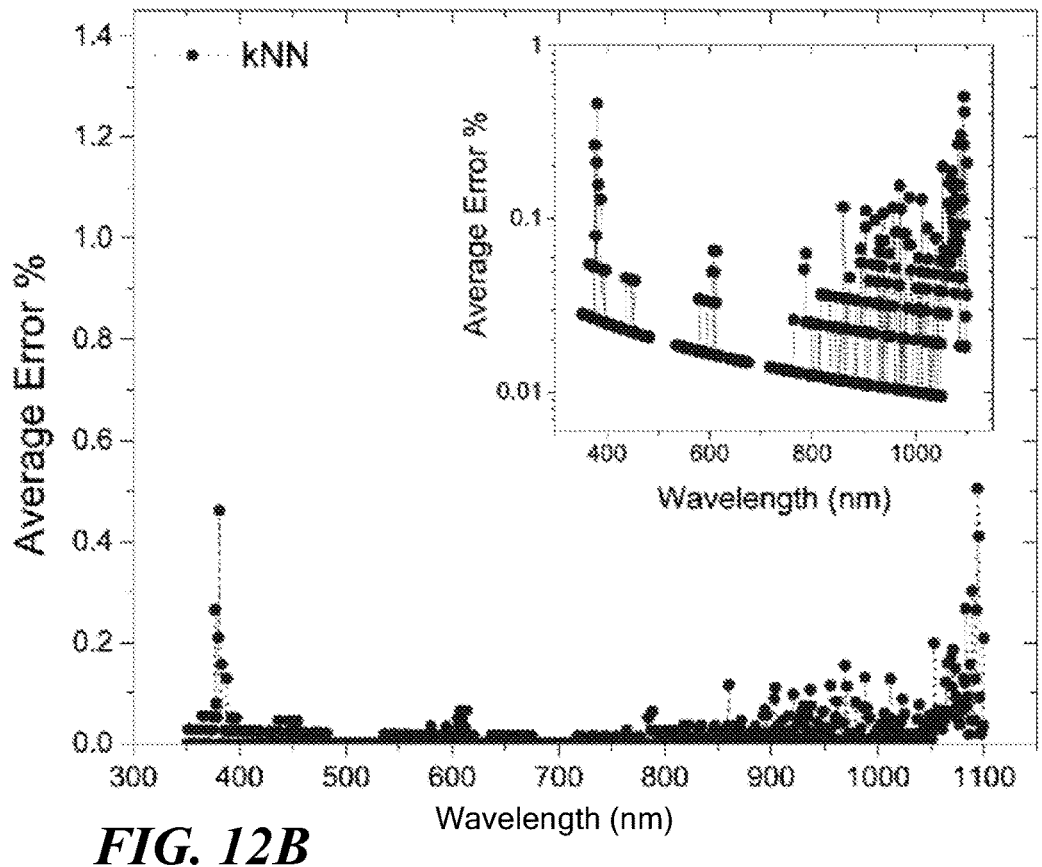
Figure 12C:
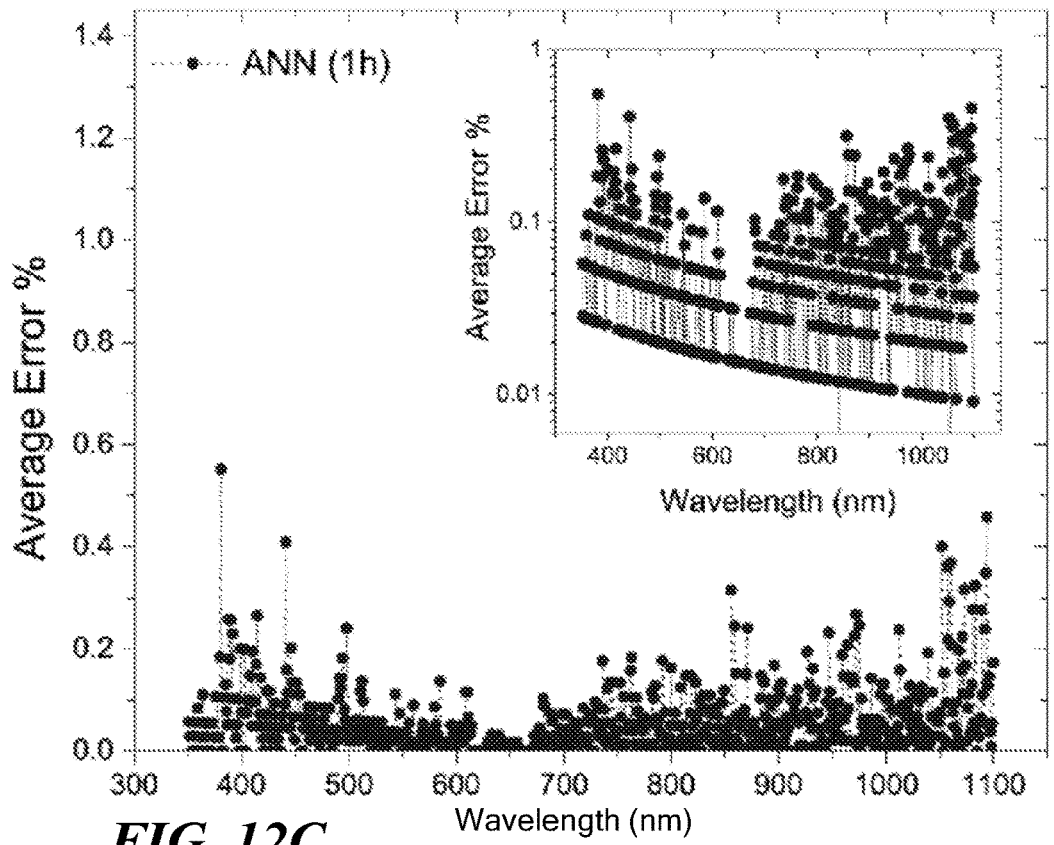
Figure 12D:
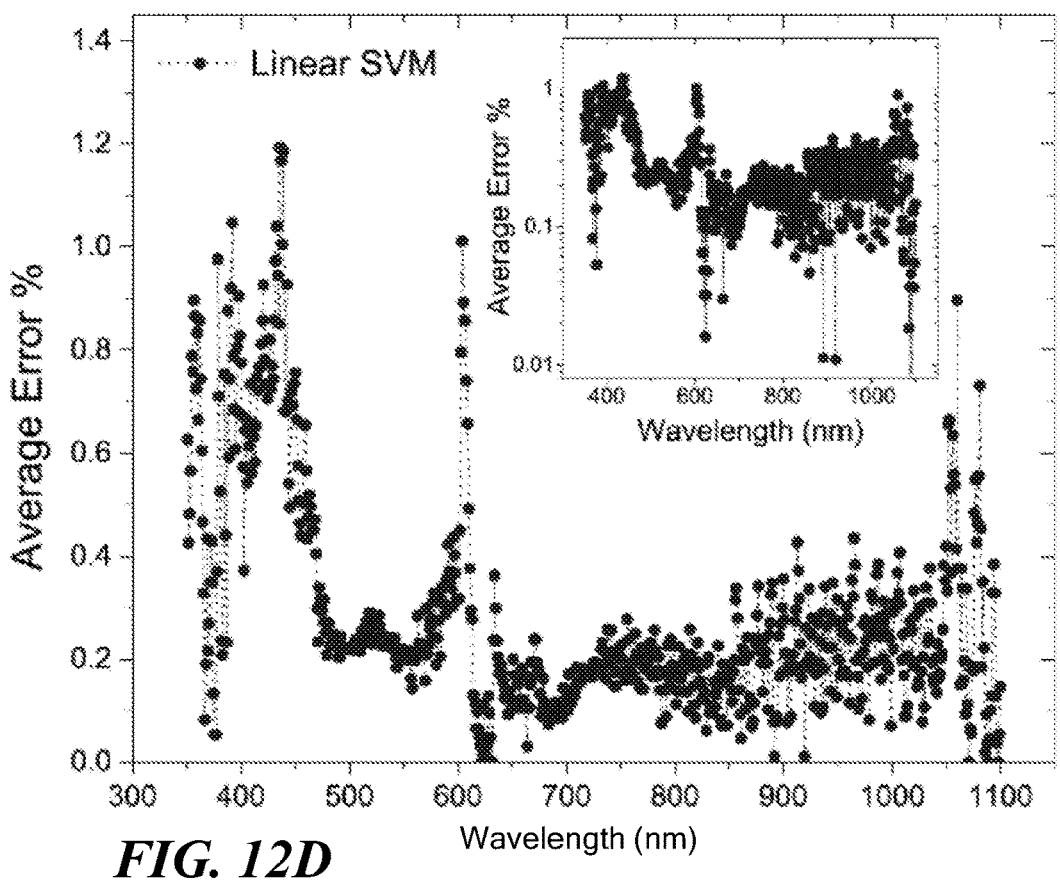

Schematic representations that distinguish the various machine learning approaches used are presented in FIGS. 11A-11D. In FIG. 11A is shown a schematic of the Bayesian inference. FIG. 11A illustrates that at each wavelength over each filter a probability distribution can be formed from the labeled samples of that given wavelength. FIG. 11B presents a schematic of the k-nearest neighbor algorithm. Each point represents a sample in an 11-dimensional space (transmittances $t_1, \ldots, t_{11}$), but only two dimensions are shown for convenience. The unknown sample is represented by the larger dot at the center. Points generally to the left and to the right represent samples belonging to two wavelengths that have close transmittance values. The unknown sample at the center will be classified depending on the majority votes of the samples encircled in the circles depending on the number of the closest neighbors. With k=2 the choice is not certain but with k=7 the unknown sample obviously belongs to the class of points to the left of center. FIG. 11C presents a schematic representation of the fully-connected three layered artificial neural network model. Each neuron is connected to the neurons in previous layer via weight parameters that must be optimized for the model to correctly estimate the unknown samples class. The bias neurons (dark at bottom left and bottom center) are not connected to previous layers since they are by definition equal to +1. FIG. 11D presents a schematic of the non-linear support vector machine algorithm, where the wavelength classes are the same as FIG. 11B and the gray solid line draws the barrier between the two classes. The dashed lines indicate the margins. By doing a kernel trick it is possible to transform the data from feature space t to its dual space $\phi(t)$.

In real-world sensing and other "estimation" applications, the needs (i.e. speed, accuracy, low-complexity etc.) of the end-use should determine the approach or method. Keeping these in mind, the efficacy of these machine learning techniques are compared by considering the following main considerations: (a) The average error in estimating wavelength of test samples collected at the same time the training samples were collected; (b) The average absolute error for entire spectrum; (c) The required time for training; (d) The elapsed time for estimating wavelength of one test sample using model/trained parameters; (e) The effect of reducing the training set size on efficacy of each model; and (f) How well the models behave on new set of test samples collected several months after the training. Applying these four machine learning techniques to the wavelength estimation problem has revealed important facts about their efficacy. The k-nearest neighbor model algorithm appears to perform the best in terms of the estimation accuracy, however unlike the other three techniques, k-nearest neighbor model time complexity is directly proportional to the size of the training set, which will hinder its use in applications that demand real-time implementation. It is due to the fact that k-nearest neighbor model is a non-parametric algorithm, in which the model parameters actually grows with the training set size. Accordingly, 'k' should be considered as hyper-parameter in k-nearest neighbor model. On the other hand, artificial neural network models perform fastest in the test time, since all of the model parameters in artificial neural networks are learned from the data during the training time, and the test time is only the classification step, which is simply calculating the output value of an already-learned function. Typically, a larger training set improves artificial neural network's performance since it leads to a model that is more generalizable to an unseen test data. An interesting observation from these results is that the support vector machine model shows slightly larger estimation errors compared to the rest of the algorithms, however it is not sensitive to data size and is more resistant to time-dependent variations in optoelectronic response of nanomaterials i.e. to drift. Bayesian inference turns out to be very accurate, and quite fast as well.

In this analysis, the resolution of the collected wavelength samples was 1 nm. To discuss the efficacy of the wavelength estimators, the estimation error percent is defined as:

$$\text{error \%} = \frac{|\lambda_{Groundtruth}(nm) - \lambda_{Estimated}(nm)|}{\lambda_{Groundtruth}(nm)} \times 100. \tag{7}$$

The wavelength estimation accuracy from various techniques was compared. FIGS. 12A-12D shows a comparison of wavelength estimation by different machine learning techniques performed using the same set of training data comprised of 75,000 samples. The average errors are the average of error percentages for 10 test samples for each wavelength. By comparing the overall values of the average error as a function of wavelength, it is possible to see that the k-nearest neighbor (KNN) method appears to best estimate the wavelength of an unknown light source, followed by the Bayesian inference method, when the estimation conditions (time, number of filters used, training size etc.) are not constrained to low values. The artificial neural network and support vector machine (SVM) are in the $3^{rd}$ and $4^{th}$ place in overall performance on estimating wavelength of test samples. In order to perform a more quantifiable comparison between the various approaches, the average absolute error of entire spectrum was calculated by calculating the absolute error according to (7) above for all 7,500 test samples and averaging them (see FIG. 13A). In addition, the artificial neural network was performed using both 1 and 2 hidden layers, which has been presented in the comparison data shown in FIG. 13A and in FIG. 13B, where it is shown a fifth batch of columns for 2 hidden layer artificial neural network (ANN) shown with ANN($2h$) as opposed to ANN($1h$) with 1 hidden layer.

Figure 13A:
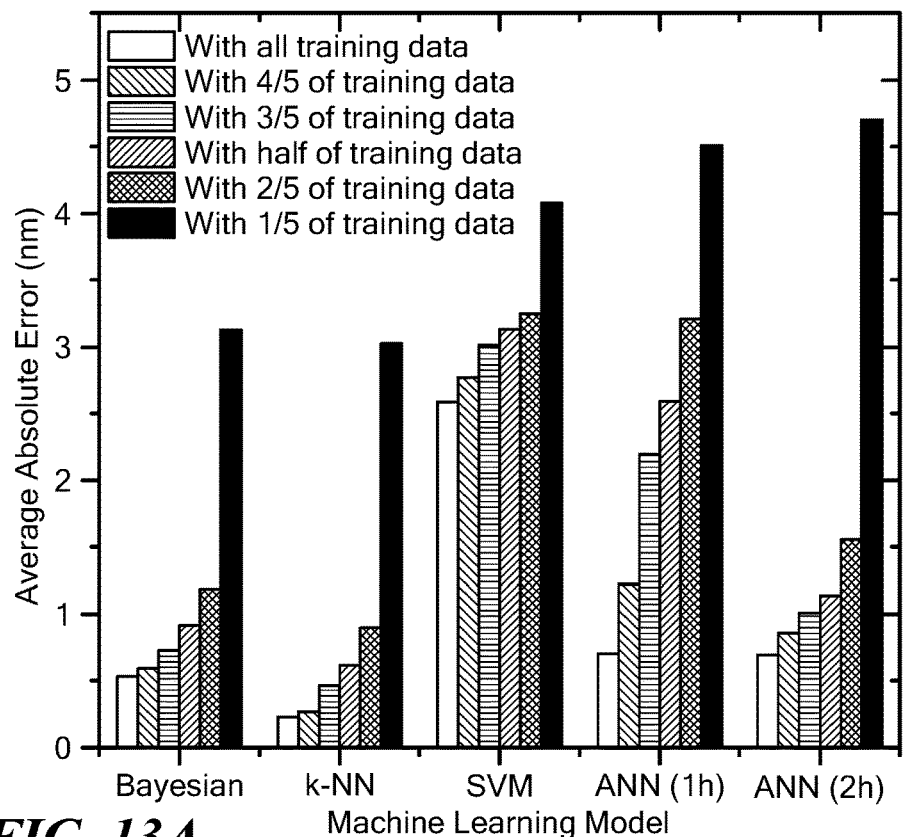
FIG. 13A shows plots of Average absolute error calculated by averaging (absolute error=|$\lambda$Real (nm)–$\Delta$Estimated(nm) |) for 7500 test samples when different sizes of randomly chosen training data are used for training the model, performed with each of the 4 machine learning methods, including 2 of the artificial neural network models.

To investigate the sensitivity of the models to the size of the training set, different portions of the training set to perform the training and testing were randomly picked, by randomly choosing one-fifth, two-fifths, etc. of the original dataset (see FIG. 13A). As was expected from theory, the SVM model is least sensitive to the size of training data, followed by the Bayesian inference. However, the ANN and kNN show considerable reduction in performance by reducing the training set size. As shown in FIG. 13A where SVM shows minor changes from one data size to other, while for instance 1 hidden layer ANN shows steep change in error values. Another important fact that was learn from FIG. 13A is the minimum size of training set required to perform reasonable estimation. In each case using only one-fifth of the training set, the average absolute error tends to increase considerably. The one-fifth translates to 20 times the number of different classes (wavelengths in this case), which sets a lower bound on size of the training dataset that must be collected. Another non-trivial and highly interesting observation is the relative errors of 1 hidden layer vs. 2 hidden layer ANN model as the error in wavelength estimation rises more sharply with decreasing training sets in the 1 hidden layer ANN, suggesting that ANN with more hidden layers appears to "learn" better from the available data and yield more accurate estimations. The other consideration is the available data is not exactly enough for this problem even when all data is used. This can be justified by seeing that even from going from four-fifths to all of the data there is a noticeable change in overall accuracy, while it was expected to see minor change in accuracy of each model if the supplied data was sufficient.

Next, the performance of each algorithm was analyzed in terms of the required time for each model to train, and afterwards to test. In kNN and Bayesian models there are no real learning steps, and as a result there is a definitive answer for value of a test sample with a given training set. The kNN model calculates the distance of the test sample from every training samples, which are fixed; so the testing time is directly related to the size of the training set. Given the relatively small dataset, the kNN model works rather fast, but most likely it would not be the case if larger dataset were used (see FIG. 13B). As for Bayesian algorithm, the training part is limited to collecting the statistics from training data. In testing step, the model searches through all probability distributions and maximizes the posteriori; though it is obviously time consuming but is independent from the training set size. Hence, in both models the main and/or only required time is for testing.

As for ANN and SVM the training step can be dynamically decided by desired conditions. In the case of SVM, the training step is governed by choice of tolerance, kernel type, etc. After the support vectors are found, the testing step is carried out by checking which side of the hyperplanes the test sample falls. In this study different choices of kernel/tolerance did not pose meaningful enhancement on the estimation efficacy of the trained SVM models.

Figure 13B:
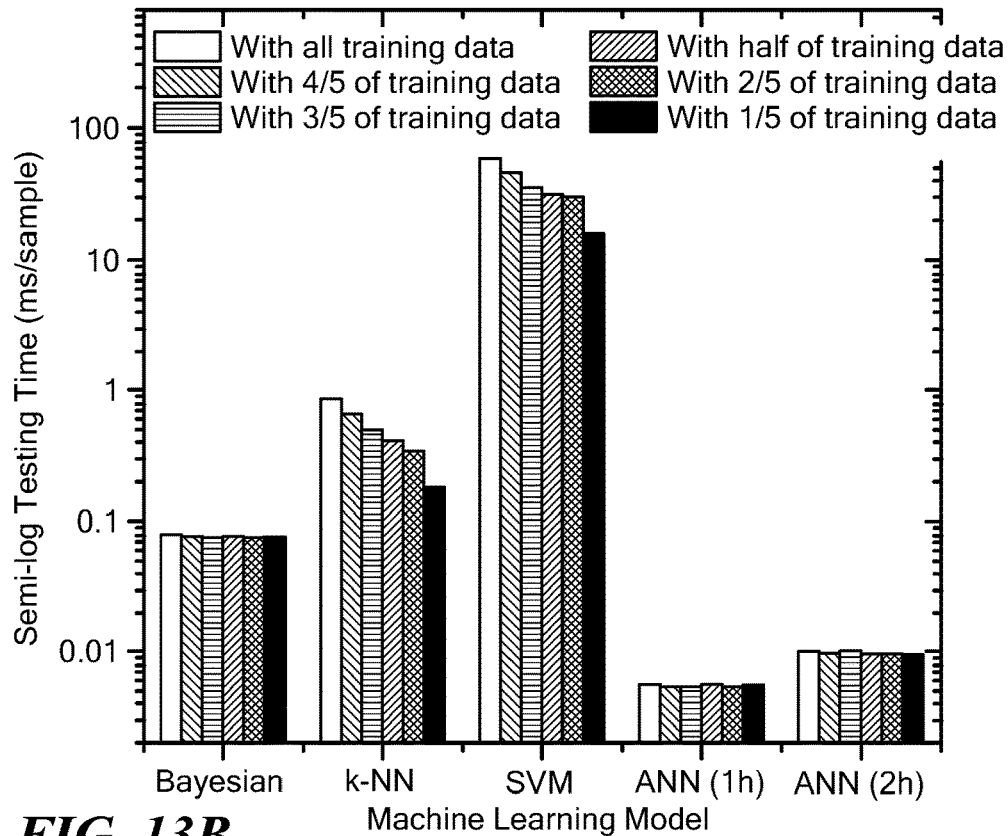
FIG. 13B shows a semi-log plot of required time to test each new sample using the trained models after all training steps are completed for each of the 4 machine learning methods, including 2 of the artificial neural network models.

The situation is quite different for ANN, since the training loop can be iterated infinite times and the results may either improve, converge, or just get stuck in a local minima. Time and computational resources for training are the real costs of the ANN algorithm, but in general ANN can fit very complicated non-linear functions that other models might not have as good performance as ANN. After the end of training step (decided by the experimenter based on the desired level of accuracy), the testing step is basically a few matrix multiplications only. Hence, the testing time of ANN is quite short and independent from the size of training set. In addition, it was found that with smaller training sets the ANN model is prone to over-fitting, i.e. the model might perform well on the training set itself but not on new test set. The required testing time for each sample when all training steps are completed is shown in FIG. 13B, which is the more relevant time-scale for real-world applications.

With the available data the kNN algorithm showed highest accuracy with the average estimation errors reaching to 0.2 nm over the entire 351-1100 nm spectrum range, where the training set is collected with 1 nm spectral resolution; but this method is not suitable for real-time applications since the required testing time is linearly proportional to the training set size. The situation is almost the same with the Bayesian algorithm which performs very well, but although its speed is not data size dependent, still the process is much slower than the other methods. The real-time speed considerations can be very well satisfied with ANN models where the estimation time can be as low as 10 microseconds, but these models as well as Bayesian and kNN turn out to be more sensitive to drift in spectral transmittance of nanomaterials over time. On the other hand SVM models show a bit lower accuracy compared to the rest but do not suffer from smaller data sizes and are more resilient to drift in spectral transmittance. Even though is has been shown in previous work that re-calibrating the filters will overcome the drifts and wears in nanomaterials, but if the re-calibration is not a readily available option for the user, the SVM model offers acceptable accuracy and longer usability over time. On the other hand if speed is a consideration, the ANN models would be the best choice, which turn out to perform well if enough data is provided. It was also observed that ANN models with more number of layers seems to learn better from the available data. The choice of model depends on the application; for instance spectroscopy does not demand a fast real-time output but accurate and precise estimations. There are other applications especially in biology, for instance in DNA sequencing, where the accuracy of the peak wavelength is not of importance as long as it is estimated close enough, but the time is of vital importance.

Furthermore, the possibility of modeling the drift of nanomaterials over time by observing the gradual changes in the filter functions was verified, hence, being able to predict the filter function at later times, and thereby increase the accuracy of the machine learning algorithms and usability of the filters over longer periods of time. FIG. 14A shows average absolute error of estimation in semi-log scale using all training data for test samples collected at the same time as the training data, compared to the test samples collected after one and two months. FIG. 14B shows third order polynomial functions fitted to the average transmittance of filters $f_1$ and $f_{11}$ over a period of ~400 days; scatter plots are the average measured transmittance values and the solid lines indicated the fitted functions. FIG. 14C shows average absolute error of estimating wavelength of test samples collected two months after training when no modification is applied to the model (black bars), and when the training sample-label pairs are corrected using the drift functions (gray bars) in Bayesian and k-nearest neighbor models. The efficacy of each machine learning model in the optical sensing problem reveals some key differences between this problem and other applications of machine learning in material science and engineering. The drift of nanomaterials properties for instance, which poses an important complication on the problem via evolving class distributions i.e. gradually modifying the response function of the filters even though the classes i.e. wavelengths remain the same. The other difference is in the feature selection. In optical sensing problem a very small number of features are chosen from optoelectronic properties (transmittance only in this case) of the nanomaterials, while in other areas the feature vector can be huge and very complex.

Example 4: Generating Large Synthetic Training Samples for the Inference Model

For statistical modeling, a large data set for testing was generated. To calculate the individual filter likelihood $P(t_k|\lambda_j)$, it was assumed that transmittance data $t_k$ of filter k at wavelength $\lambda_i$ come from a Gaussian normal distribution with the mean value of $\mu_k^i$ and standard deviation of $\sigma_k^i$, so $P(t_k|\lambda_i) \sim N(\mu_k^i, \sigma_k^i)$. This likelihood was used as a generative model to synthesize a large amount of training samples, which were used in the training error reported in FIG. 6D, FIG. 7A, and FIG. 7B. For each wavelength using the mentioned likelihood, 100 vectors of 11 elements (1 transmittance per each of 11 filters) were generated. These generated training samples were used to see how well the model is performing on the training set itself. To clarify further, to generate the training samples at each wavelength, a random transmittance value from the previously collected Gaussian normal distribution is generated per filter. Generating these values for all 11 filters at each wavelength gives one training sample. Now, imagine the wavelength of this generated transmittance vector is not known. What is desired is to check whether the model can estimate the wavelength of this sample that is drawn randomly from the parent distribution. To do so, the corresponding wavelength of each of these 100 synthesized examples per wavelength was estimated, and the 100 estimated wavelengths were averaged and used to find the average error. The same was performed for all wavelengths in the mentioned spectrum. But so far the model is only tested on the generated training samples randomly drawn from the training data and not on the real "test samples". This is where the test samples were collected using UV-vis-NIR independent from the training data; in other words, the test samples were not part of training set seen by the machine learning code. For the test samples, single wavelength mode of the UV-vis-NIR was used and collected 100 transmittance values for each of 11 filters at 31 distinct wavelengths (350, 375, 400, . . . , 1050, and 1075 nm). This makes it 100×31 test samples in total where each sample is a vector of 11 transmittance values (denoted by vector T)-one per filter. The wavelength of these 10 (averaged) samples was estimated by using Bayesian inference, and the average test errors are presented on the same plots as the training errors are.

For k-Nearest Neighbor, by averaging the 120 spectra per filter, a single spectrum per filter was obtained which was a 775×11 matrix of transmittance values (11 filter and 775 spectrum elements between 325 and 1100 nm). With this T matrix at hand, the sum of squares of absolute errors between the test vector (1×11 elements) and each row (wavelength) of T was calculated. The wavelength with smallest square value was picked as the best estimation.

Example 5: Analysis Methods

Figure 9:
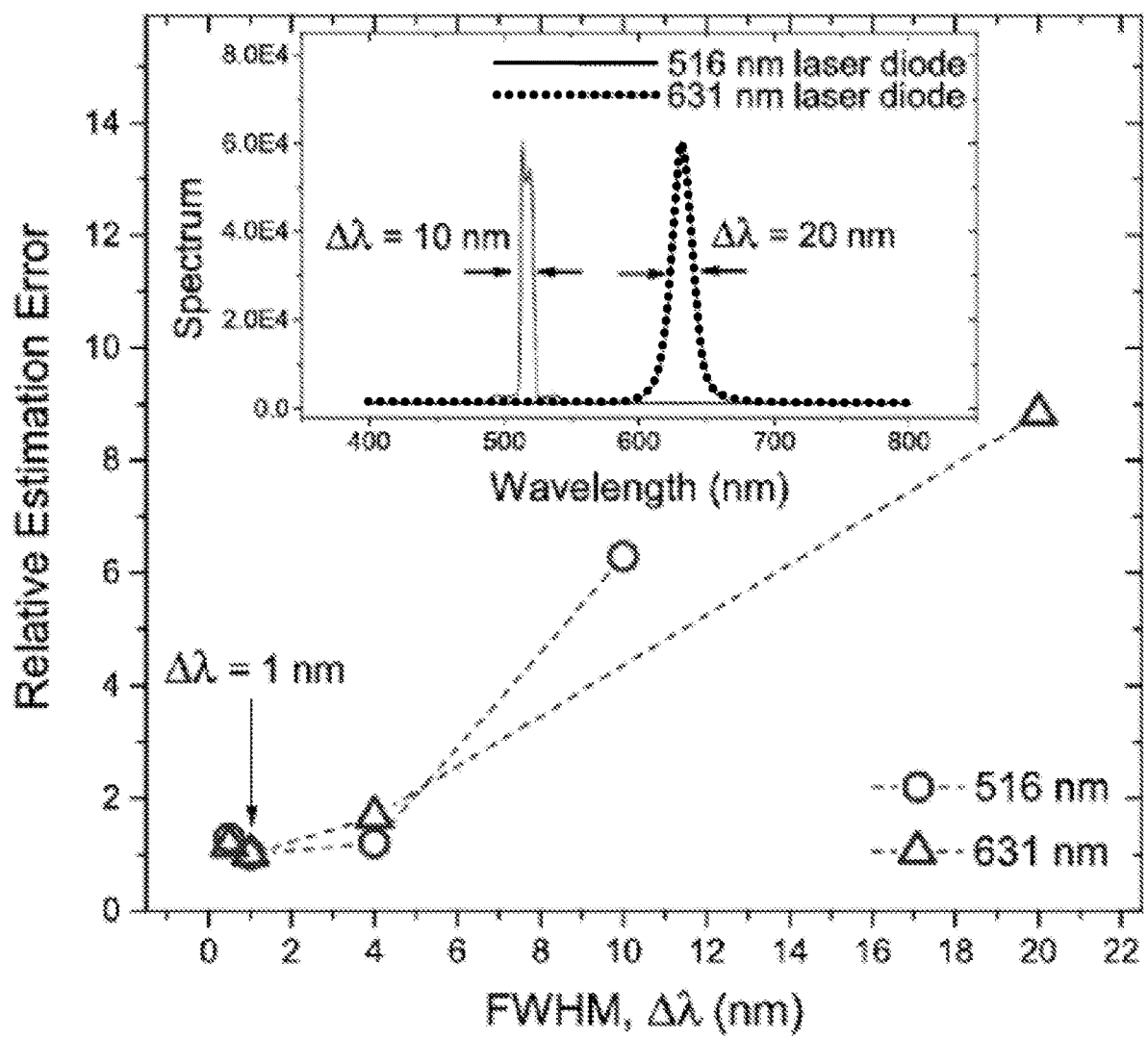
FIG. 9 shows relative error of estimation (defined as relative error=error $(\Delta\lambda)$/error$(\Delta\lambda=1$ nm)) for estimating wavelength of a light source with a different FWHM and intensity than the ones that were used for training, (i.e., $\Delta\lambda=1$ nm for training). In the inset of FIG. 9, the real spectra of laser diodes, which are used as a light source with different FWHM, is shown.

For transmittance measurements, because the glass itself was not part of the nanomaterial filters, by placing a clean glass slide as reference in reference beam position of the UV-vis-NIR, the effect of glass itself was removed and the outcome was transmittance of the 2D nanomaterials only (FIG. 5C). The transmittance spectrum of each filter was measured about 120 times over the 325-1100 nm range with $\Delta\lambda$=1 nm FWHM of UV-vis. FIG. 5A shows the transmittance spectrum of 11 filters where each curve is averaged from 120 measurements of the same filter on the scale of 0-1, with 1 being 100% transparent. As it can be seen, all filters have finite nonzero transmittance over a fairly large wavelength range. To collect the test samples, the transmittance of the 11 filters over 31 distinct wavelengths was measured with FWHM of $\Delta\lambda$=1 nm. The training and test errors are presented in FIG. 6D. Furthermore, a few more test samples were collected at wavelengths 516 and 613 nm with FWHM of $\Delta\lambda$=0.5-4 nm. The relative test errors are shown in FIG. 9.

To examine new light sources, laser diodes were chosen as different light sources. To further test the efficacy of the model, two laser diodes (purchased from Thorlabs) were placed inside a UV-vis-NIR spectrometer and the internal light of spectrometer was then blocked, and the transmittance of the laser diode lights from the 11 filters was measured and successful for wavelength estimation. It is notable that neither the internal light of UV-vis-NIR nor its diffraction grating was used anymore; i.e., after the training is done, only the two single-cell photodetectors and 11 filters were enough to do estimation for any new light source. The real spectra of these laser diodes were collected by an Ocean Optics spectrometer and shown in the inset of FIG. 9. As can be seen in the inset of FIG. 9, their center wavelength was at 516 and 613 nm; for this reason the different light source measurements presented in FIG. 9 are performed at these specific wavelengths. The relative test errors with respect to the error of estimating the wavelength of internal light beams of UV-vis-NIR with $\Delta\lambda$=1 nm FWHM on the same wavelengths are provided in the same figure.

To acquire atomic force microscopy, scanning electron microscopy, and Raman spectra, a single drop of the $MoS_2$ and $WS_2$ suspensions (Example 1) was drop-casted on two separated silicon/silicon dioxide slides. The reason behind this was, first, to do layer thickness investigation via atomic force microscopy, since the glass slide does not possess as smooth surface as silicon dioxide wafer does; second, the characteristic Raman peak of silicon dioxide is a standard measure to study the nanomaterial properties. AFM and SEM investigations revealed that a typical nanoflake of $MoS_2$ was about 500 nm long and about 30 nm thick (FIG. 3C, FIG. 3D). The SEM and AFM images with the corresponding line profiles of AFM'ed areas and Raman spectrum of the exfoliated samples can be found in FIGS. 3C-3E and FIGS. 4C-4E.

REFERENCES

Hejazi, D.; Liu, S.; Ostadabbas, S.; Kar, S., "Transition Metal Dichalcogenide Thin Films for Precise Optical Wavelength Estimation using Bayesian Inference", ACS Applied Nano Materials 2019

Hejazi, D.; Liu, S.; Farnoosh, S; Ostadabbas, S.; Kar, S., "Development of Use-specific High Performance Cyber-Nanomaterial Optical Detectors by Effective Choice of Machine Learning Algorithms", arXiv:1912.11751.

The invention claimed is:

1. A device for identifying a wavelength of an electromagnetic radiation within a wavelength band, the device comprising:
   (i) a first two-dimensional material having a thickness of 50 nm or less and a first wavelength-dependent transmittance over the wavelength band;
   (ii) a second two-dimensional material having a thickness of 50 nm or less and a second wavelength-dependent transmittance over the wavelength band;
   (iii) one or more detectors suitable for detecting electromagnetic radiation over the wavelength band; wherein the device is configured to allow the electromagnetic radiation to penetrate the first two-dimensional material and illuminate one of said one or more detectors, whereby the detector provides a first electrical signal, and to allow the electromagnetic radiation to penetrate the second two-dimensional material and illuminate one of said one or more detectors, whereby the detector provides a second electrical signal; and
   (iv) a processor and a memory comprising instructions for identifying the wavelength of said electromagnetic radiation using said first and second electrical signals; wherein the device is configured to use artificial intelligence to identify a spectral pattern of said electromagnetic radiation.

2. The device of claim 1, wherein the wavelength band is in the range from about 1 picometer to about 100 micrometers, or from about 200 nanometers to about 3 micrometers.

3. The device of claim 1, wherein the first and/or second two-dimensional materials are selected from the group consisting of molybdenum disulfide, tungsten disulfide, boron nitride, bismuth selenide, indium gallium arsenide, germanium, phosphorene, graphene, carbon nanotubes, molybdenum diselenide, gallium nitride, diamond, tungsten diselenide, molybdenum ditelluride, and combinations thereof.

4. The device of claim 1, wherein the first and/or second two-dimensional materials are selected from transition metal dichalcogenides.

5. The device of claim 1, wherein the first and second two-dimensional materials are configured as mosaic of the first and second two-dimensional materials.

6. The device of claim 1, wherein the electromagnetic radiation is monochromatic, and a peak wavelength is identified.

7. The device of claim 1, wherein the electromagnetic radiation is polychromatic, and two or more peak wavelengths are detected.

8. The device of claim 1, wherein the device is pre-trained using a set of different electromagnetic radiation sources having different spectral patterns.

9. The device of claim 1, wherein the wavelength band corresponds to a visible wavelength band or portion thereof, and the identified spectral pattern corresponds to a color.

10. The device of claim 1, wherein the one or more detectors are each selected from the group consisting of a gamma ray detector, an X-ray detector, a UV/Visible detector, a photodetector, a photodiode, an IR detector, and a far infrared detector.

11. The device of claim 1, wherein the wavelength band is in the gamma radiation spectrum, x-ray radiation spectrum, ultraviolet radiation spectrum, visible radiation spectrum, or infrared radiation spectrum.

12. The device of claim 1, further comprising one or more of a wireless transmitter or transceiver, an output display, a battery, and a lens or other element for collecting, directing, focusing, or filtering electromagnetic radiation entering the device.

13. The device of claim 1, wherein the thickness of the first two-dimensional material is 10 nm or less, and wherein the thickness of the second two-dimensional material is 10 nm or less.

14. A plurality of devices of claim 1 configured as an array.

15. The plurality of devices of claim 14, configured as an imaging device.

16. The plurality of devices of claim 15, wherein the wavelength band of the individual devices corresponds to a visible wavelength band or portion thereof, and the plurality of devices provides a color image as output.

17. The device of claim 1, or an array of devices of claim 1, which is incorporated into a machine, robot, drone, color analysis device, self-driving vehicle, image recognition system, telescope, microscope, satellite, security system, spectrometer, detector, or artificial eye.

18. A method of identifying the wavelength of the electromagnetic radiation within the wavelength band, the method comprising:
   (a) providing the device of claim 1, or an array of devices of claim 1;
   (b) inputting the electromagnetic radiation into the device or array of devices, whereby the radiation is transmitted through the first and second two-dimensional materials and then is detected by one of the one or more detectors, whereby first and second electrical signals are provided to the processor of the device or array of devices; and
   (c) analyzing the first and second electrical signals, whereby the wavelength of the electromagnetic radiation is identified.

19. The method of claim 18, further comprising training an artificial neural network using a training set of electromagnetic radiation sources.

20. The method of claim 18, further comprising identifying a peak wavelength of a monochromatic electromagnetic radiation.

21. The method of claim 18, further comprising identifying two or more peak wavelengths of a polychromatic electromagnetic radiation.

22. The method of claim 18, further comprising identifying a spectral pattern of an electromagnetic radiation.

23. The method of claim 18, further comprising identifying a color of an electromagnetic radiation.

24. The method of claim 18, further comprising providing a spectral or color image output.

25. The method of claim 18, further comprising use of a Bayesian model, a k-nearest neighbor model, an artificial neural network, a support vector machine, a least regression model, or a combination thereof.

* * * * *